(12) United States Patent
Ayres et al.

(10) Patent No.: US 9,760,061 B2
(45) Date of Patent: Sep. 12, 2017

(54) DYNAMIC APERTURE HOLOGRAPHY

(71) Applicant: Akonia Holographics, LLC, Longmont, CO (US)

(72) Inventors: Mark R. Ayres, Boulder, CO (US); Kenneth E. Anderson, Boulder, CO (US); Fredric R. Askham, Loveland, CO (US); Bradley J. Sissom, Boulder, CO (US)

(73) Assignee: AKONIA HOLOGRAPHICS LLC, Longmont, CO (US)

( * ) Notice: Subject to any disclaimer, the term of this patent is extended or adjusted under 35 U.S.C. 154(b) by 0 days.

(21) Appl. No.: 14/385,469

(22) PCT Filed: Mar. 21, 2014

(86) PCT No.: PCT/IB2014/060014
§ 371 (c)(1),
(2) Date: Sep. 15, 2014

(87) PCT Pub. No.: WO2014/115129
PCT Pub. Date: Jul. 31, 2014

(65) Prior Publication Data
US 2015/0062675 A1   Mar. 5, 2015

Related U.S. Application Data

(63) Continuation of application No. 13/875,071, filed on May 1, 2013, now abandoned.
(Continued)

(51) Int. Cl.
G03H 1/26 (2006.01)
G03H 1/02 (2006.01)
(Continued)

(52) U.S. Cl.
CPC .......... *G03H 1/265* (2013.01); *G03H 1/0248* (2013.01); *G03H 1/2645* (2013.01);
(Continued)

(58) Field of Classification Search
CPC .......... G03H 1/00; G03H 1/0005; G03H 1/02; G03H 1/04; G03H 1/0402; G03H 1/08;
(Continued)

(56) References Cited

U.S. PATENT DOCUMENTS 5,128,693 A * 7/1992 Tatemichi et al. ............ 347/260
5,483,365 A   1/1996 Pu et al.
(Continued)

OTHER PUBLICATIONS

Tao et al, Spatioangular multiplexed storage of 750 holograms in an Fe:LiNbO3 crystal. (Optics Letters, vol. 18,No. 11, Jun. 1, 1993).*
(Continued)

*Primary Examiner* — Stephone B Allen
*Assistant Examiner* — Jyotsna Dabbi

(57) ABSTRACT

Methods and systems for performing dynamic aperture holography are described. Examples include a method of recording multiple holograms in a photosensitive recording medium, where multiple signal beam angular apertures used to record the multiple holograms differ from each other. The multiple signal beam angular apertures can facilitate using a larger range of reference beam angular apertures. The multiple holograms are typically multiplexed, and examples of dynamic aperture holography enable packing the multiplexed holograms more densely in the recording medium. Some dynamic aperture holography systems include monocular objective lens architecture.

20 Claims, 29 Drawing Sheets

Related U.S. Application Data

(60) Provisional application No. 61/755,893, filed on Jan. 23, 2013.

(51) Int. Cl.
  *G11B 7/0065* (2006.01)
  *G11B 7/007* (2006.01)
  *G11B 7/1381* (2012.01)

(52) U.S. Cl.
  CPC ........ *G11B 7/0065* (2013.01); *G11B 7/00772* (2013.01); *G11B 7/1381* (2013.01); *G03H 2001/267* (2013.01)

(58) Field of Classification Search
  CPC ........ G03H 1/26; G03H 1/2645; G03H 1/265; G03H 1/16; G03H 2223/17; G03H 2225/55; G03H 2001/026; G03H 2001/267; G03H 1/0248; G03F 7/004; G03F 7/028; G11B 7/0065; G11B 2007/13727; G11B 7/083; G11B 2007/00653; G11B 7/00; G11B 7/09; G11B 7/135; G11B 7/139; G11B 7/1374; G11B 7/1381; G11B 7/1392; G11B 7/00772; G11C 13/042; G02B 5/32; A01B 12/006
  See application file for complete search history.

(56) References Cited

U.S. PATENT DOCUMENTS

| | | | |
|---|---|---|---|
| 8,238,216 B2 * | 8/2012 | Choi | G11B 7/139 369/103 |
| 2006/0221421 A1 | 10/2006 | Kanesaka et al. | |
| 2008/0100890 A1 * | 5/2008 | Curtis | G06F 9/45533 359/3 |
| 2008/0239426 A1 * | 10/2008 | Jeong | G03H 1/265 359/22 |
| 2008/0309998 A1 | 12/2008 | Nakamura | |
| 2008/0316894 A1 | 12/2008 | Choi | |
| 2009/0097086 A1 | 4/2009 | Szarvas et al. | |
| 2010/0172003 A1 * | 7/2010 | Tachibana | G11B 7/083 359/22 |
| 2010/0253688 A1 * | 10/2010 | Cui | G01S 13/723 345/443 |
| 2012/0127548 A1 | 5/2012 | Curtis et al. | |
| 2012/0135338 A1 | 5/2012 | Cole et al. | |

OTHER PUBLICATIONS

Supplementary European Search Report for analogous EPO Application No. EP14743821 (European entry from PCT/IB2014/060014)—Dated Jul. 5, 2016.

\* cited by examiner

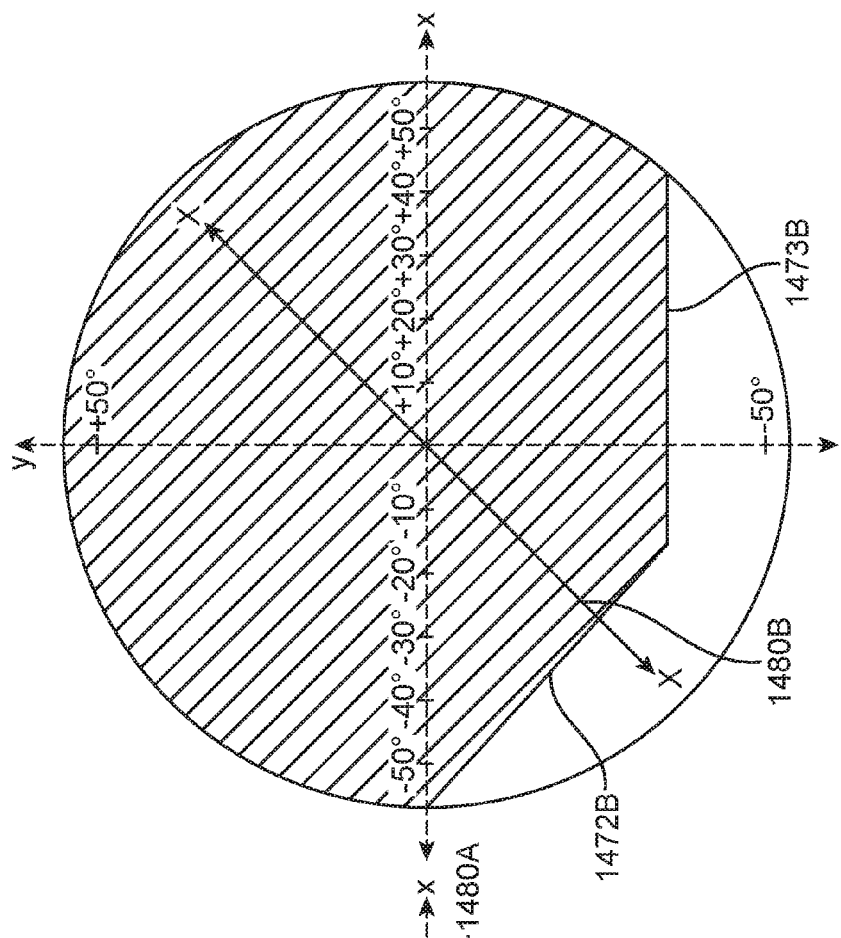
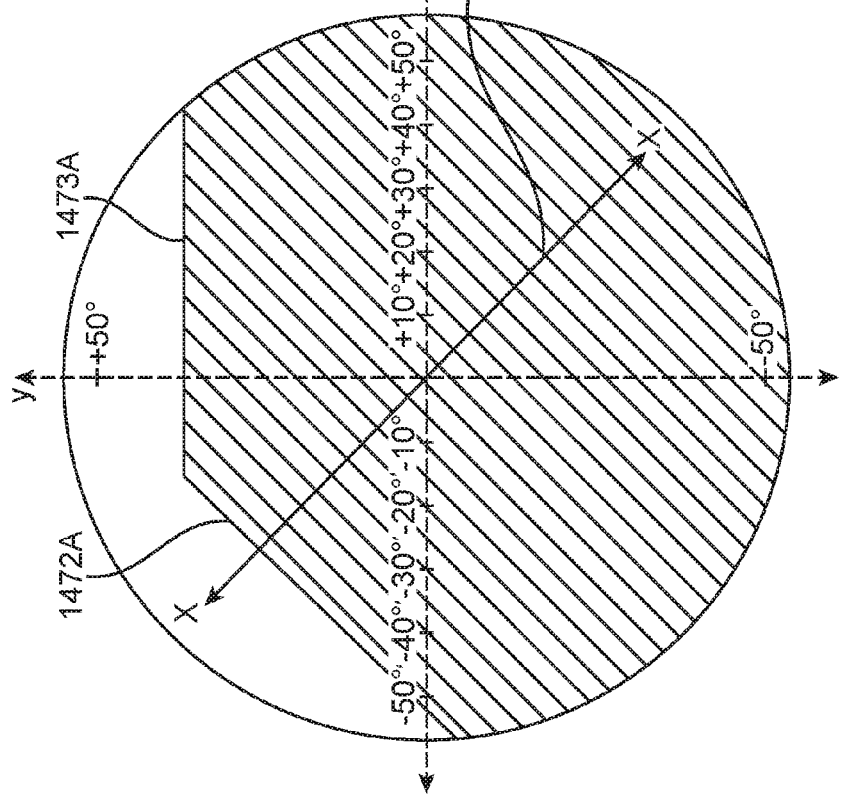

DYNAMIC APERTURE HOLOGRAPHY

CROSS-REFERENCE TO RELATED APPLICATIONS

The present application claims priority to U.S. patent application No. 61/755,893, filed Jan. 23, 2013, and U.S. patent application Ser. No. 13/875,071, filed May 1, 2013. Applications U.S. 61/755,893 and U.S. Ser. No. 13/875,071, the entire disclosures of are hereby incorporated by reference, have the same inventors as the present application.

FIELD OF THE INVENTION

The present invention relates generally to holographic data storage.

BACKGROUND

High density data storage is in great demand, and holographic techniques enable storing data at higher density relative to other data storage techniques. Holographic data storage also facilitates faster transfer rate for recording and retrieving data compared to other optical storage techniques and to magnetic tape based data storage.

Holographic data storage generally includes modulating a light beam to contain data, with the modulated light beam often referred to as a signal beam. The light beam is typically modulated to contain an image of a two dimensional pattern of light and dark pixels. An interference pattern created between the signal beam and a reference beam is typically recorded as a hologram in a three dimensional volume of photosensitive storage medium. The hologram comprises a diffraction grating from which a duplicate of the signal beam, containing a duplicate of the pixel pattern image, can be generated by use of a probe beam familiar to persons skilled in the art. The probe beam is generally identical or very similar to the reference beam (or its conjugate) used to record the hologram. The duplicate of the signal beam can be referred to as a reconstructed signal beam, and the duplicate of the pixel pattern image can be referred to as a reconstructed image or a holographic image of the pixel pattern.

Recording the hologram in three dimensions facilitates using an interior volume of the photosensitive storage medium for data storage. In contrast, non-holographic optical data storage techniques usually store data in a two dimensional area residing on a surface of the storage media. Variations in which multiple layers of stored data reside beneath a storage media surface are known, but light scatter caused by the multiple layers usually limits the extent to which multilayer techniques can be exploited to increase storage density in non-holographic optical data storage.

Holographic data storage can include techniques for recording multiple holograms, each of which includes an individual pixel pattern, in a common volume of storage medium, such that the stored multiple holograms (i.e. multiple diffraction gratings) at least partially overlap with each other in the common volume. Such techniques are commonly referred to as multiplexing or multiplex holography, and the at least partially overlapping holograms can be referred to as being multiplexed. Individual holographic images can be reconstructed from the multiplexed holograms by use of appropriate reconstruction techniques familiar to persons skilled in the art. Known multiplexing techniques include, but are not limited to, angle, wavelength, collinear, and polytopic multiplexing.

Different multiplexing techniques can be combined to increase data storage density. For example, a stack of angle multiplexed holograms can be stored partially overlapping an adjacent stack of angle multiplexed holograms, but offset from completely overlapping by at least a beam waist. So configured, the holograms residing in the stack and the adjacent stack can be referred to as being polytopically multiplexed.

Data storage requirements appear to be ever increasing, and increased data storage density is thus in demand. Accordingly, new techniques that increase density at which data can be stored holographically are needed. Additional benefit may reside where the new techniques can be combined with known multiplexing methods.

BRIEF SUMMARY OF THE INVENTION

In an example of dynamic aperture holography, multiple signal beam angular apertures that differ from each other are used to record multiple holograms. The multiple holograms typically, but not necessarily, overlap each other in the photosensitive recording medium. The use of multiple signal beam angular apertures can enable use of a larger range of reference beam angular apertures than if the multiple signal beam angular apertures were identical to each other. Use of a larger range of reference beam angular apertures enables recording more holograms in the recording medium, which can result in greater density of data storage. Some embodiments of dynamic aperture holography are well suited for use with holography systems having monocular objective lens architecture.

BRIEF DESCRIPTION OF THE DRAWINGS

FIGS. 14A and 14B illustrate beam angular apertures, as represented in beam angular aperture maps, showing multiple locus aperture sharing according to an embodiment of the present invention.

DETAILED DESCRIPTION

Figure 1:
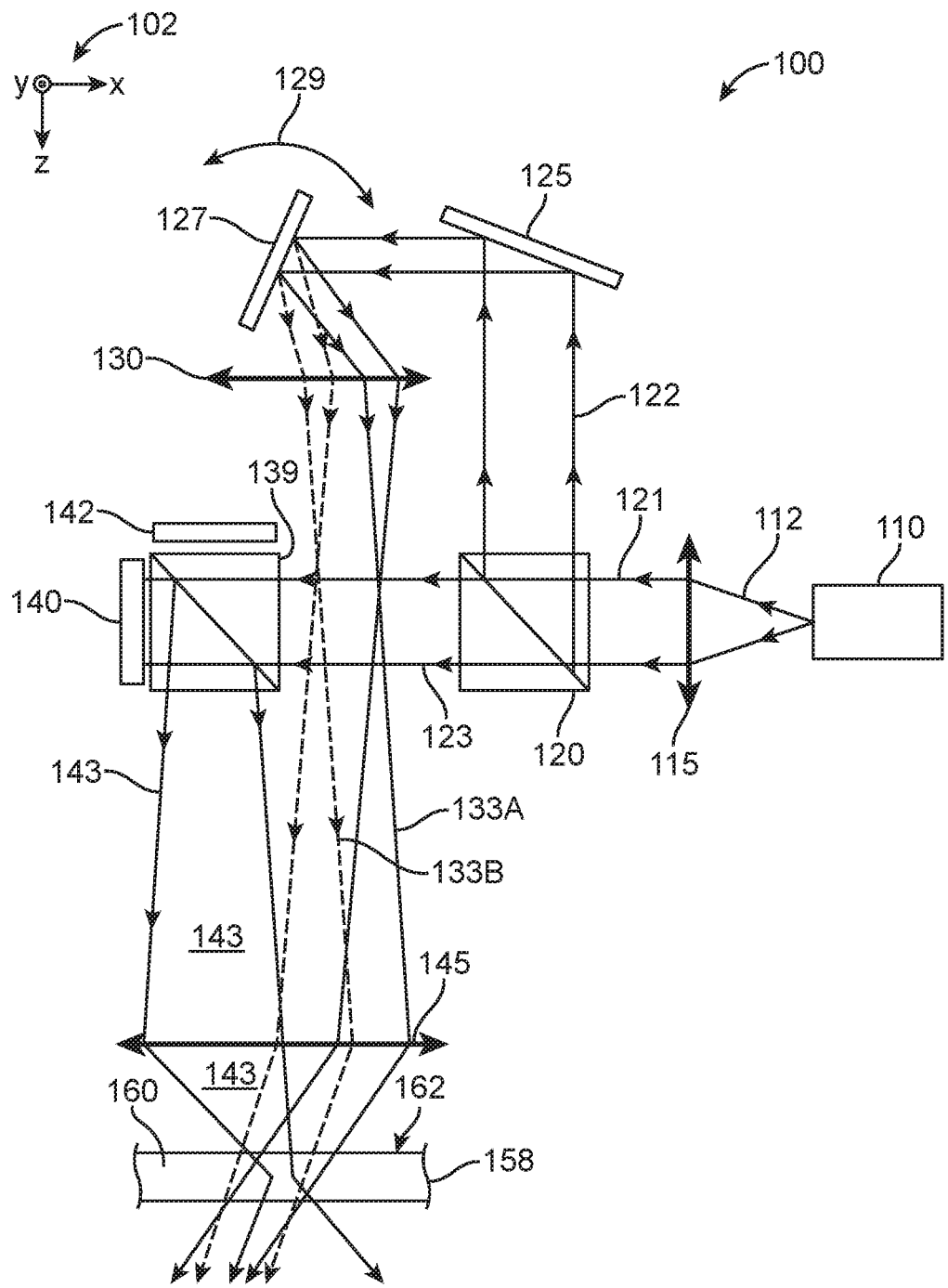
FIG. 1 illustrates a side, cross-section view of an embodiment of a holographic data storage system including monocular architecture.

Embodiments of dynamic aperture holography according to the present invention include devices, systems, and methods for performing dynamic aperture holography. The devices, systems, and methods typically result in increased holographic data storage density. Embodiments include a method of recording multiple holograms in a photosensitive recording medium, wherein multiple signal beam angular apertures used to record the multiple holograms differ from each other. The multiple holograms are typically, but not necessarily, multiplexed (i.e. they at least partially overlap each other in a common volume of medium), and embodiments of dynamic aperture holography enable packing the multiplexed holograms more densely in the recording medium.

For example, where angle multiplexing is combined with dynamic aperture holography, a stack of angle multiplexed holograms can include many more holograms, within which reside much more data, than by use of angle multiplexing in the absence of dynamic aperture holography. The increased data density is typically, but not necessarily, realized using holographic data recording devices having monocular architecture, wherein signal beams and reference beams share a common objective lens. An objective lens is typically a last lens that a signal beam or reference beam passes through before the beams enter a photosensitive recording medium.

Persons of ordinary skill in the art will recognize that holographic data storage using monocular architecture is well described in prior art literature, for example in U.S. Pat. No. 7,742,209, titled MONOCULAR HOLOGRAPHIC DATA STORAGE SYSTEM ARCHITECTURE. U.S. Pat. No. 7,742,209 is incorporated herein by reference. Dynamic aperture holography can combine with other multiplexing techniques, including, but not limited to, collinear multiplexing.

A signal beam angular aperture consists of a set of all light ray angles for a signal beam where the beam is incident upon a recording medium surface. The light ray angles are defined relative to a recording medium surface normal.

In conventional angle multiplexing familiar to persons skilled in the art, multiple holograms are generated in a common volume of photosensitive recording media by use of multiple signal beams, each of which has a signal beam angular aperture that is identical to other signal beam angular apertures of the multiple signal beams. The multiple holograms, which typically completely overlap in the common volume, can be referred to as a stack. Each of the multiple holograms in the stack is recorded by use of a reference beam having a reference beam angular aperture that is unique among multiple reference beams used to record the stack of holograms. Accordingly, the multiple reference beams used to record a single stack of angle multiplexed holograms have angular apertures that fall within a range of angles. The range of angles can be referred to as a reference beam angular aperture locus.

Holographic recording systems comprising a monocular architecture (also referred to as a monocular objective lens architecture) include a single objective lens that is shared by both a signal beam and a reference beam. When angle multiplexing is practiced, for example, using a device having monocular objective lens architecture, the reference beam angular aperture locus is limited by the signal beam angular aperture locus. This is because the reference beam angular aperture is typically separated from it's respective signal beam angular aperture by at least a minimum angle. The angle by which a signal beam angular aperture is separated from a reference beam angular aperture where the signal beam angular aperture and the reference beam angular aperture are closest, is referred to as a separation angle.

Where at least a minimum separation angle is not maintained, holographic recording density usually degrades. Therefore, to achieve desired hologram recording density, the reference beam angular aperture locus is typically limited in order to maintain at least the minimum separation angle. It is noted that that the signal beam angular apertures are essentially equal to each other for all holograms recorded in a stack of holograms recorded by conventional angle multiplexing.

Figure 2A:
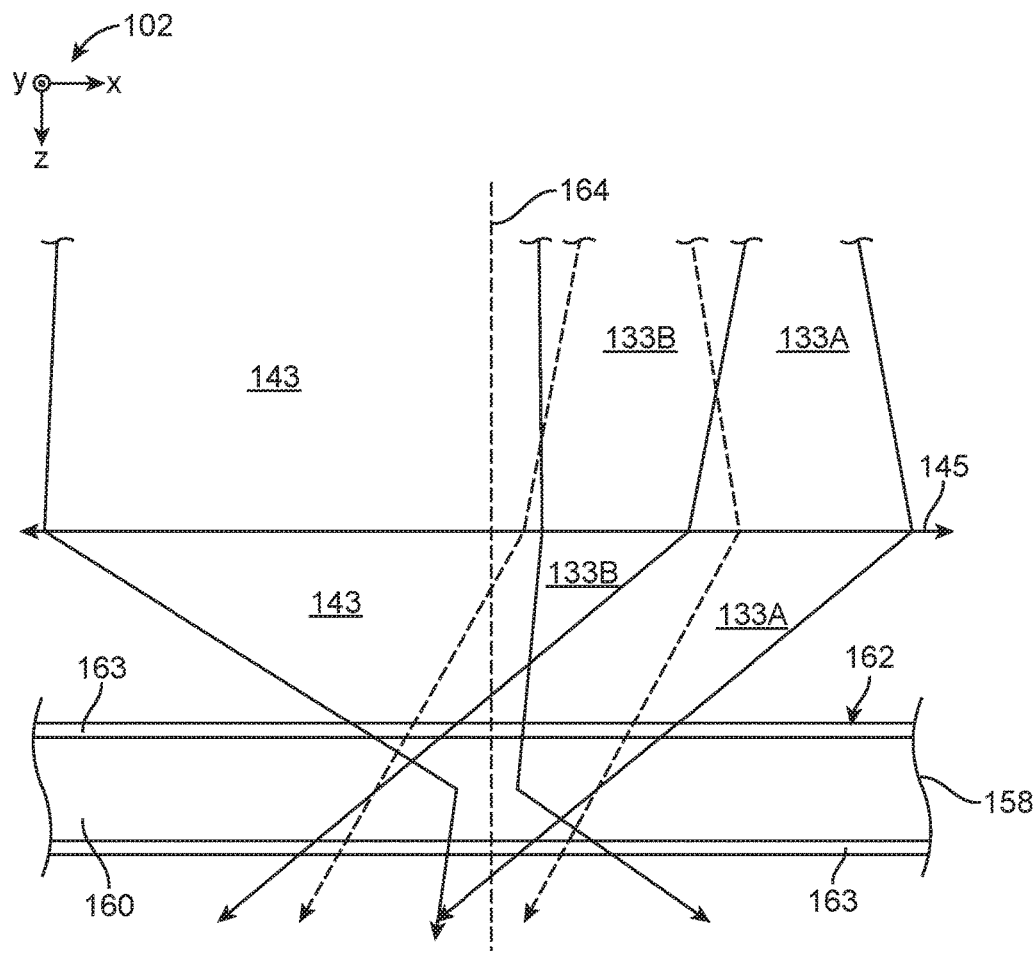
FIG. 2A illustrates a side, cross-section view of an embodiment of a holographic data storage system including monocular architecture.
Figure 2B:
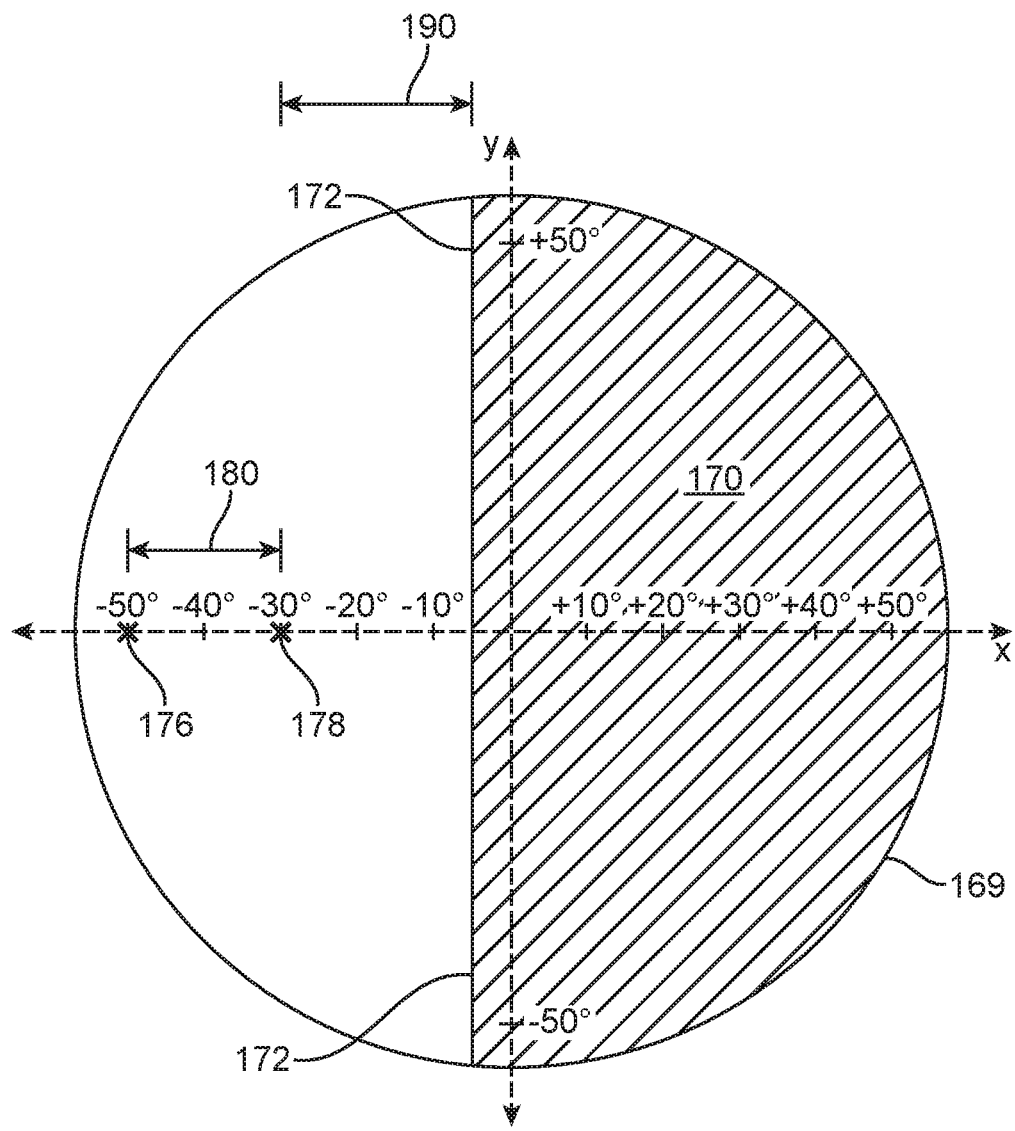
FIG. 2B illustrates beam angular apertures, as represented in a beam angular aperture map, for light beams whose cross-sections are illustrated in FIG. 2A

A holographic recording system 100 embodying monocular architecture is illustrated with respect to angle multiplexing in the absence of dynamic aperture holography in FIGS. 1, 2A and 2B. Light source 110 produces light beam 112, which passes through collimating lens 115 to produce a collimated light beam 121. The light source is typically, but not necessarily, a diode laser equipped with an external cavity and tuned to operate in single-mode state at approximately 405 nm. A beam splitter 120 splits the collimated light beam 121 into a nascent signal beam 123 and a nascent reference beam 122. The holographic recording system 100 further comprises a detector 142 for reading reconstructed holographic images. The detector 142 typically does not play a role in recording holograms.

The nascent signal beam 123 propagates through polarizing beam splitter (PBS) 139 to spatial light modulator (SLM) 140. The SLM 140 modulates the nascent signal beam 123 by imparting an image of a pattern of light and dark pixels into the beam, thus generating a signal beam 143. The signal beam 143 propagates from SLM 140, through objective lens 145 and into a photosensitive recording medium 158. Light rays of the signal beam 143 are incident upon an external surface 162 of the recording medium 158 at a range of angles of incidence relative to external surface normal 164. A complete set of the angles of incidence of the signal beam 143 is referred to as a signal beam angular aperture 170.

The signal beam angular aperture 170 is shown in FIG. 2B. FIG. 2B is an angular aperture map on which the signal beam angular aperture 170 is illustrated as a two dimensional plot. The angular aperture map in FIG. 2B shows the signal beam angular aperture 170 consists of light ray angles of incidence that range from −5.0 degrees to +58.2 degrees in the x component, and from −58.2 degrees to +58.2 degrees in the y component. Only the x component is illustrated in FIG. 2A, where the y component would project out of the plane of the page. Circle 169 encircles a maximum possible beam angular aperture using objective lens 145, which has a numerical aperture (NA) of 0.85 and a lens aperture angle of 116.4 degrees.

The photosensitive recording medium 158 typically comprises a photosensitive recording layer 160 sandwiched between two substrate structures 163. The substrate structures 163 usually comprise thermoplastic, and the photosensitive recording layer typically includes photosensitive monomers in a polymeric matrix.

The signal beam 143 interferes with reference beam 133A to generate an interference pattern, which is recorded as a hologram within the photosensitive recording layer 158. Subsequently, another signal beam interferes with another reference beam 133B to generate another interference pattern, which is recorded as another hologram in the photosensitive recording layer 158. The signal beam 123 and the other signal beam have identical beam angular apertures. Accordingly, the signal beam 123 depicted in FIGS. 1 and 2A can also represent the other signal beam.

The reference beam 133A and the other reference beam 133B are generated from nascent reference beam 122 as follows. The nascent reference beam 122 is reflected to a beam directing device 127 by mirror 125, whereupon the reference beam 133A or other reference beam 133B is directed through lens 130. Prior to reflection by the beam directing device 127, the light beam is referred to as the nascent reference beam 122, and after reflection by the beam directing device 127 the light beam is referred to as the reference beam 133A or the other reference beam 133B. The beam directing device 127 is a mirror galvanometer configured to rotate through a defined range so as to reflect the incident nascent reference beam 122 at various angles. Accordingly, reference beam angular aperture is typically adjusted by use of the beam directing device 127. Rotation of the beam directing device 127 is indicated by rotation arrow 129.

The reference beam 133A or other reference beam 133B passes through lens 130, objective lens 145, and into photosensitive recording medium 158. Light rays in the reference beam 133A are incident upon recording medium 158 at −50.0 degrees relative to recording medium normal in an x component, and at 0.0 degrees in a y component. The reference beam angles of incidence are collectively referred to as a reference beam angular aperture 176. Coordinates x, y, and z are shown in FIGS. 1 and 2 by coordinate legend 102. The reference beam angular aperture 176 is represented in FIG. 2B.

Reference beam angular aperture 176 and other reference beam angular aperture 178 are plotted on an angular aperture map in FIG. 2B. As illustrated in FIG. 2B, the reference beam angular aperture 176 consists of a set of light ray angles of incidence at −50.0 degrees in the x component and 0.0 degrees in the y component. In practice, the reference beam angular aperture 176 includes multiple angles clustered about a single angle defined as x=−50.0 degrees and y=0.0 degrees. However, because the multiple angles of the reference beam angular aperture are clustered very tightly, the reference beam angular aperture 176 can be considered to consist of one angle at x=−50.0 degrees and y=0.0 degrees. Precise control of reference beam angular aperture is usually necessary for high efficiency angle multiplexing, where two holograms in a stack of multiplexed holograms can be adequately resolved where a difference between their reference beam angular apertures is as small as 0.075 degree.

As illustrated in FIG. 1, the beam directing device 127 is rotated to redirect nascent reference beam 122 through lens 130 at an angle that differs from that of the reference beam 133A. Thus another reference beam 133B propagates through objective lens 145 and is incident upon the recording medium external surface 162 at angles of incidence of −30.0 degrees in x and 0.0 degrees in y. The other reference beam angles of incidence are collectively referred to as the other reference beam angular aperture 178, represented in FIG. 2B. FIG. 2B is an angular aperture map on which the other reference beam angular aperture 178 is illustrated as a two dimensional plot. The angular aperture map in FIG. 2B shows the other reference beam angular aperture 178 consisting of a set of light ray angles of incidence at −30.0 degrees in the x component and 0.0 degrees in the y component. In practice, the other reference beam angular aperture 178 includes multiple angles clustered about a single angle defined as x=−30.0 degrees and y=0.0 degrees. However, as described previously with respect to the reference beam angular aperture 176, the other reference beam angular aperture 178 can be considered to consist of one angle at x=−30.0 degrees and y=0.0 degrees.

A separation angle 190 is a least difference between the other reference beam angular aperture 178 and the signal beam angular aperture 170. As best seen in FIG. 2B, the reference beam angular aperture 176 and the other reference beam angular aperture 178 do not overlap with the signal beam angular aperture 170. Beam angular apertures that do not overlap can be said to be disjoint. Thus where two beam angular apertures are disjoint, the two beam angular apertures do not share a common light ray angle of incidence. Similarly where a range of beam angular apertures (sometimes referred to as a beam angular aperture locus) for a set of reference beams does not overlap with a signal beam angular aperture locus for a set of signal beams, the reference beam angular aperture locus and the signal beam angular aperture locus include no common light ray angle of incidence. The loci can thus be said to be disjoint.

A stack of multiplexed holograms recorded according to FIGS. 1, 2A and 2B consists of a hologram recorded with the reference beam 133A, and another hologram recorded with the other reference beam 133B. As best seen in FIG. 2B, the other reference beam angular aperture 178 resides closest to a signal beam angular aperture near edge 172, with a separation angle 190 of 25.0 degrees separating the other reference beam angular aperture 178 and the signal beam angular aperture 170. It is noted that the signal beam angular aperture 170 is equal to the other signal beam angular aperture, and hence also equal to the signal beam angular aperture locus for a set of signal beams consisting of the signal beam 143 and the other signal beam. For the system 100 depicted in FIGS. 1, 2A, and 2B, a minimum separation angle between a reference beam angular aperture and its respective signal beam angular aperture has been determined to be 22.5°. Only the signal beam 143 is illustrated in FIGS. 1 and 2A because the other signal beam and the signal beam have identical beam angular apertures. Similarly, only the signal beam angular aperture 170 is mapped in FIG. 2B.

The reference beam angular aperture locus 180 for the reference beam 133A and the other reference beam 133B consists of a range of angles in the x component of 20.0 degrees. Thus for a holographic data recording device capable of stacking angle multiplexed holograms with a minimum difference between adjacent reference beam angular apertures of 0.104°, the reference beam angular aperture locus 180 would be sufficient to record 192 holograms in the stack.

In contrast to the holography described above and illustrated in FIGS. 1, 2A, and 2B, embodiments of dynamic aperture holography according to the present invention include recording multiple holograms by use of multiple signal beams, wherein the multiple signal beams have beam angular apertures that differ from each other. The differing beam angular apertures enable use of a larger range of reference beam angular apertures (i.e. a larger reference beam angular aperture locus) as follows. In the absence of dynamic aperture holography, certain reference beam angular apertures are impermissible because they encroach on signal beam angular apertures that are constant (i.e. all of the signal beam angular apertures are equal), such that a minimum separation angle is not maintained. However, by varying signal beam angular apertures, many of the previously impermissible reference beam angular apertures become useable because the signal beam angular apertures are altered accommodate the many of the previously impermissible reference beam angular apertures, while maintaining at least the minimum separation angle. Thus a greater reference beam angular aperture locus is facilitated, which translates to a greater number of unique reference beams available for recording a stack of multiplexed holograms. Accordingly, more holograms can be multiplexed, for example, in a stack of angle multiplexed holograms. In addition, some holograms can be larger, and thus include more data, than in the absence of dynamic aperture holography. Data storage density is thus increased.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

Unless clearly indicated otherwise in context of use, the term "or" as used in this specification and appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "directly coupled" or "coupled directly," as used in this specification and appended claims, refers to a physical connection between identified elements, components, or objects, in which no other element, component, or object resides between those identified as being directly coupled.

The term "generally," as used in this specification and appended claims, means mostly, or for the most part.

The term "substantially equal," as used in this specification and appended claims with respect to separation angles, refers to separation angles within 2 degrees of each other.

The terms "active" and "active state," as used in this specification and appended claims with respect to a portion of a spatial light modulator or other data encoding element, refers to a portion that includes data encoded therein with a combination of light and dark pixels. An image of the combination of light and dark pixels in an active portion of a data encoding element is typically recorded as a hologram in a photosensitive recording medium.

The terms "inactive" and "inactive state," as used in this specification and appended claims with respect to a portion of a spatial light modulator or other data encoding element, refers to a portion that does not included data encoded therein. All pixels in an inactive portion are typically, but not necessarily, in a dark state. The pixels in an inactive portion are typically not represented in a hologram recorded in a photosensitive recording medium.

The terms "beam angular aperture," "angular aperture of a beam," and similar terms, as used in this specification and appended claims, refers to a set of all light ray angles in a beam of light, where the beam is incident upon a recording medium external surface. The light ray angles are defined with respect to an axis perpendicular to the recording medium external surface (i.e. normal to the surface). Light ray angles have two components (typically designated x and y), and can thus be represented as points on a plane. Accordingly, a beam angular aperture can be represented as a two dimensional plot of a set of points representing the set of all light ray angles in a beam of light incident upon a recording medium surface as described above (i.e. the set of points representing the beam angular aperture). Such a representation can be illustrated on an angular aperture map. A beam angular aperture map typically includes two perpendicular axes designated x and y.

Beam angular aperture should not be confused with lens aperture angle, sometimes called lens angular aperture, which refers to an apparent angle of a lens aperture as seen from the lens focal point. Because a beam angular aperture is a function of an objective lens through which the beam passes, the beam angular aperture is related to aperture angle for the objective lens. For example, for an objective lens with a numerical aperture of 0.85, the objective lens has an aperture angle (in air) of 116.4 degrees, which is to say a maximum cone of light that can enter or exit the objective lens (in air) is 116.4 degrees (the half-angle for the maximum cone=a sin (0.85)=58.2 degrees). Thus the maximum possible beam angular aperture for a beam of light passing through the objective lens is a set of angles ranging about the optical axis from +58.2 degrees to −58.2 degrees, which can be represented on a beam angular aperture map as a set of points occupying a circle having a radius of 58.2 degrees. Thus, while lens angular aperture and beam angular aperture are somewhat related, the two terms are distinct.

Differences between various beam angular apertures can be evaluated by comparing maps on which the various beam angular apertures are depicted. Beam angular apertures, as depicted on angular aperture maps, can differ from each other in size, shape, or position. Where beam angular apertures differ from each other, their respective constituent light ray angles differ from each other.

A first way in which beam angular apertures can differ from each other is in "size." For the purposes of this specification and appended claims, "size" refers to quantity of area occupied by a beam angular aperture on an angular aperture map.

A second way in which beam angular apertures can differ from each other is in shape. Beam angular apertures that differ from each other in size typically, but not necessarily, also differ from each other in shape. However, it is possible for beam angular apertures to differ in shape but not in size.

A third way in which beam angular apertures can differ from each other is in "position." For the purposes of this specification and appended claims, "position" refers to where a set of points representing light ray angles resides on an angular aperture map relative to map axes. Differences between a beam angular aperture and another beam angular aperture can be readily discerned by overlaying a map of the beam angular aperture on a map of the other beam angular aperture.

A signal beam typically has a beam angular aperture consisting of a relatively broad range of light ray angles. Consequently, a signal beam angular aperture, as represented on a map, typically has a readily discerned size (i.e. area). Conversely, the range of light ray angles in a reference beam angular aperture is usually, but not necessarily, very narrow, such that a on a map, a reference beam angular aperture typically appears as a single point. The single point can reside on at least one axis of the map. Accordingly, reference beam angular apertures can frequently be represented by a single number having units of degrees, in which case the reference beam angular aperture can be referred to as reference beam angle.

A First Embodiment Dynamic Aperture Holographic System

Figure 3A:
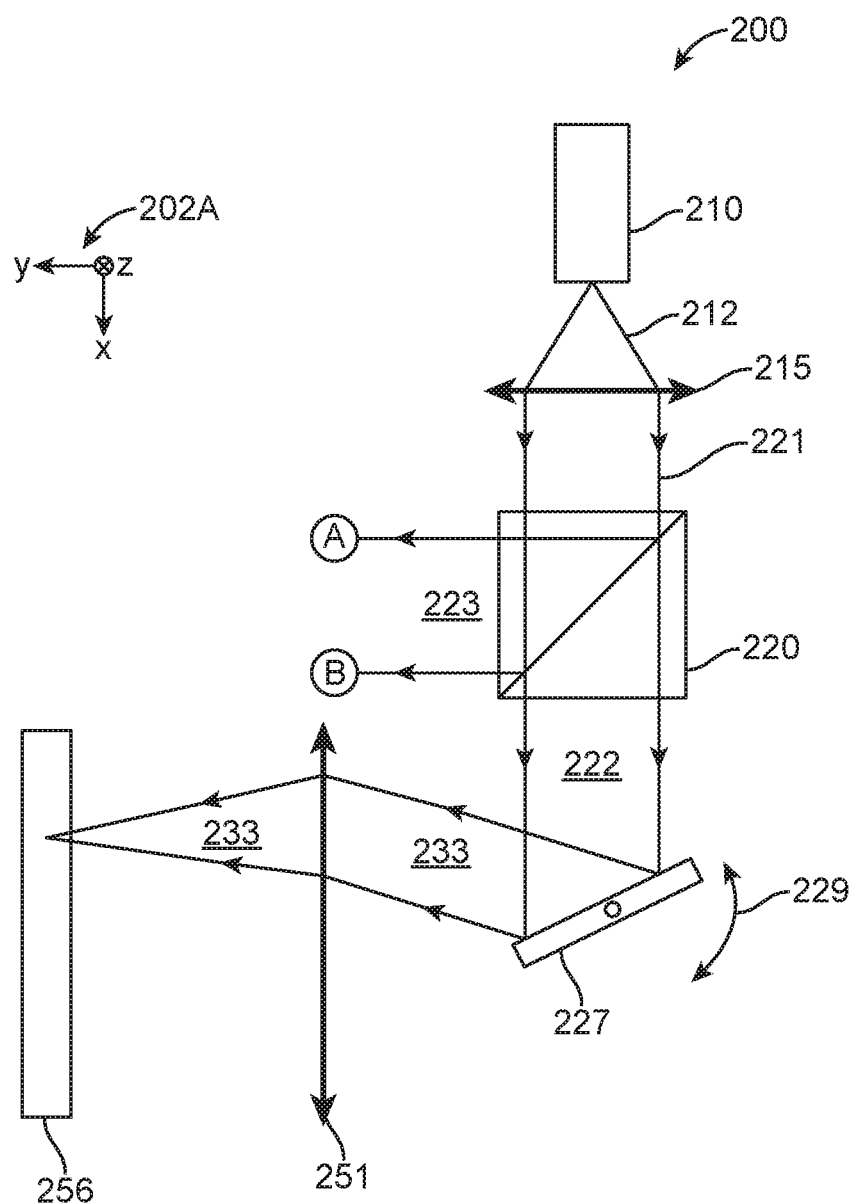
FIG. 3A illustrates a side, cross-section view of a holographic data storage system including monocular architecture, adapted to perform dynamic aperture holography according to an embodiment of the present invention.
Figure 3B:
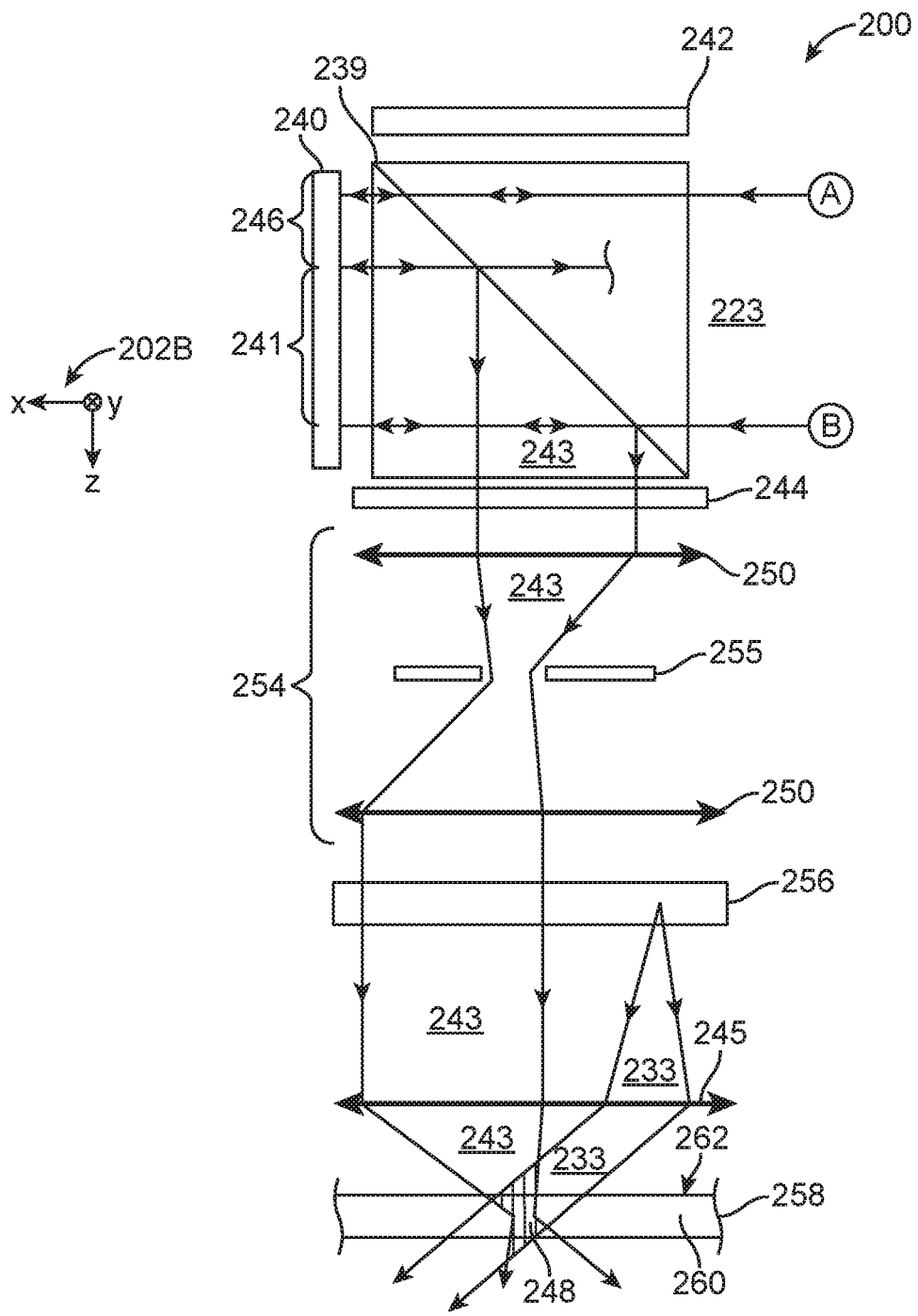
FIG. 3B illustrates a side, cross-section view of a holographic data storage system including monocular architecture, adapted to perform dynamic aperture holography according to an embodiment of the present invention.
Figure 3C:
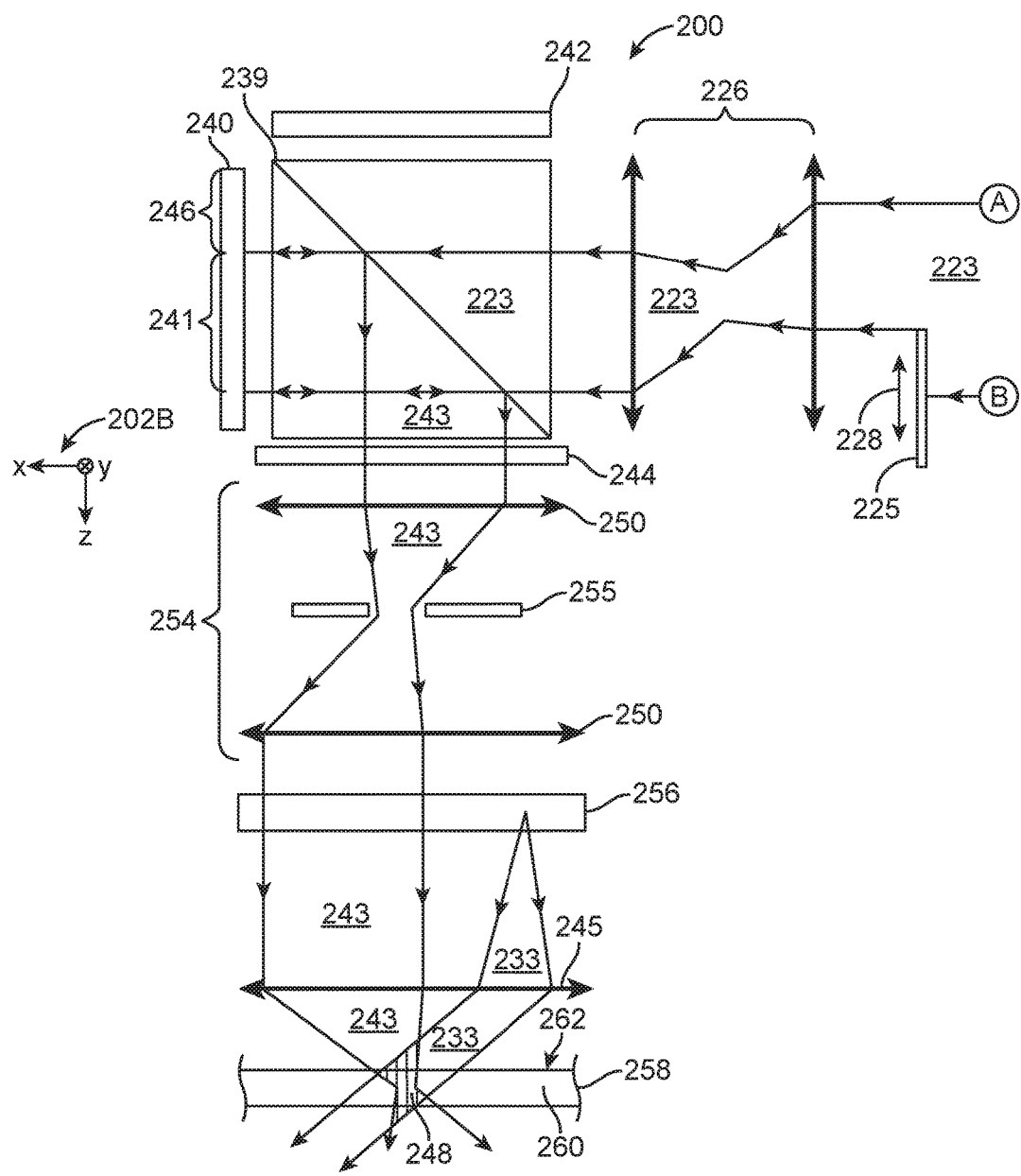
FIG. 3C illustrates a side, cross-section view of a holographic data storage system including monocular architecture, adapted to perform dynamic aperture holography according to an embodiment of the present invention.
Figure 4:
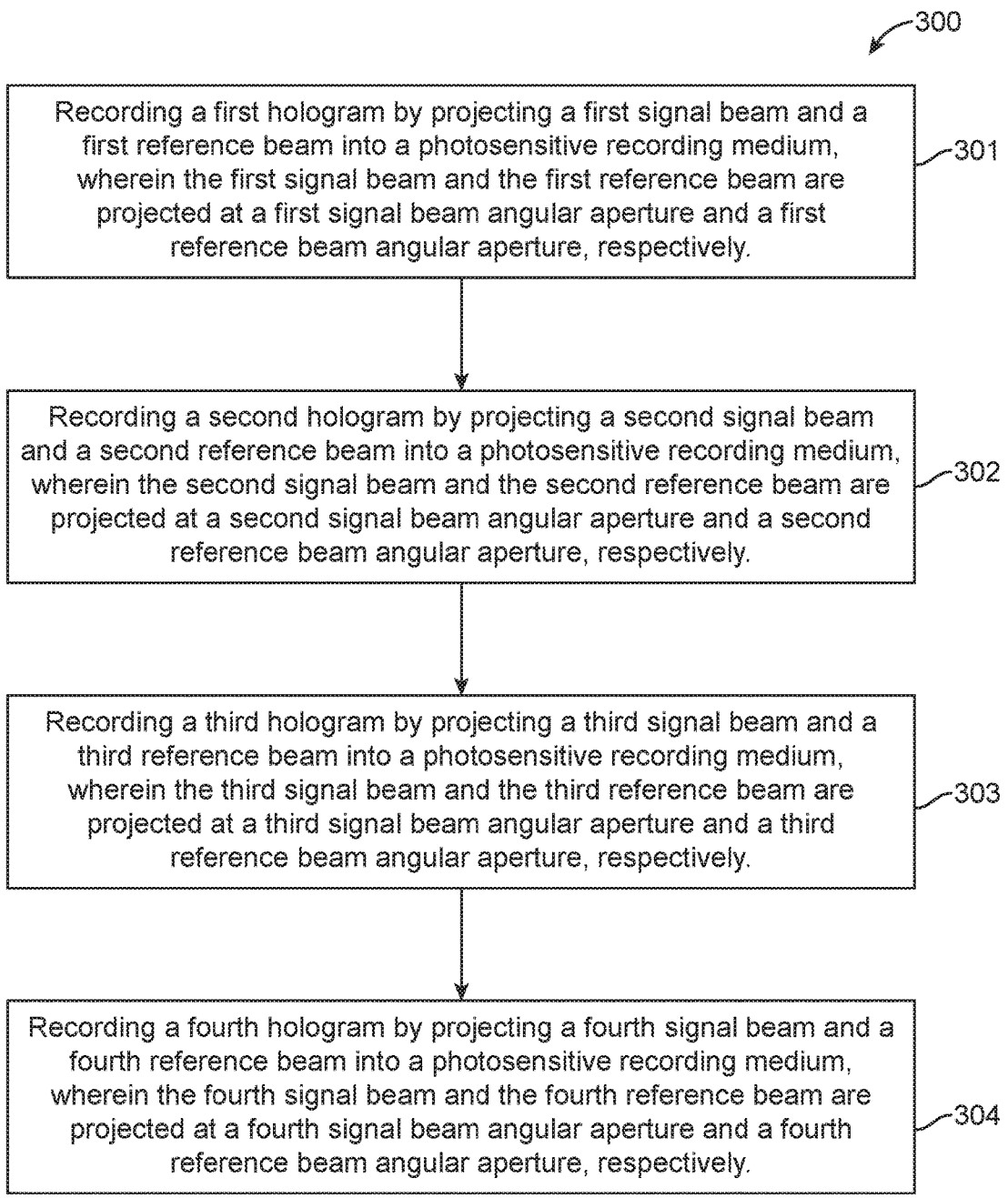
FIG. 4 illustrates a method for using dynamic aperture holography according to an embodiment of the present invention.

A first embodiment dynamic aperture holographic system 200 is illustrated in FIGS. 3A and 3B. A variation of the first embodiment system 200 is illustrated in FIG. 3C. The first embodiment dynamic aperture holographic system 200 includes monocular architecture, but some other embodiments of dynamic aperture holographic systems do not include monocular architecture. The first embodiment system 200 is configured to readily perform dynamic aperture holography by recording multiple holograms using multiple signal beams, wherein the multiple signal beams have multiple signal beam angular apertures that differ from each other. As shown in FIG. 3A, the first embodiment system 200 comprises light source 210 configured to produce light beam 212, which passes through collimating lens 215 to produce a collimated light beam 221.

The light source 210 is typically, but not necessarily, an external cavity, single-mode, tunable diode laser having an output greater than 40 mW. Wavelength tuning is accomplished using a transmissive grating in an external cavity configuration, resulting in a tuning range of 402-408 nm. Mode stability is accomplished using a closed loop locking algorithm that utilizes current and wavelength tuning to give a minimum contrast ratio of 0.75 (0-1 scale) of fringes viewed in a shearing interferometer. The laser light source 210 is engineered and calibrated to hold the following specifications over a temperature range from 15° C.-35° C.: available output power is greater than 40 mW over the tuning range of 402 nm to 408 nm; absolute wavelength accuracy is +/−150 μm P-P; beam size=1.7 mm+/−0.1 mm; aspect ratio=1+/−0.1; beam pointing stability is less than 1 arcmin, <25 arcsec nominal; beam centering drift is less than 50 μm; wavefront of the laser output is less than 0.050 RMS over a 1.5 mm diameter; collimation is +/−0.015 waves (Zernike Focus) over a 1.5 mm diameter. Some embodiments comprise other light sources, including but not limited to gas lasers, dye lasers, diode lasers without external cavities, and non-laser light sources.

The first embodiment system 200 further includes a beam splitter 220 that splits the collimated light beam 221 into a nascent reference beam 222 and a nascent signal beam 223. The nascent reference beam 222 propagates to beam directing device 227, whereupon it is directed as a reference beam 233 through reference beam converging lens 251. The beam directing device 227 of the first embodiment typically, but not necessarily, comprises a mirror galvanometer configured to rotate through a defined range, the rotation being depicted by rotation arrow 229. The beam directing device 227 thus directs the reference beam 233 through the reference beam converging lens 251 at various angles. Reference beam angular aperture is typically adjusted using the beam directing device 227.

The reference beam 233 is focused onto a reflecting beveled edge of a knife-edge mirror 256 by the reference beam converging lens 251, whereupon the knife-edge mirror 256 reflects the reference beam 233 and thereby directs the beam 233 through the objective lens 245 and into the photosensitive recording medium 258. Where it propagates from the objective lens 245 into the recording medium 258, the reference beam 233 is a plane wave reference beam. The knife-edge mirror 256 of the first embodiment comprises an aluminum bar that is 500 μm thick (along the y axis in FIGS. 3A and 3B) and 10 mm tall (along the z axis in FIGS. 3A and 3B). The reflecting beveled edge is highly polished in order to effectively reflect the reference beam 233, which is incident upon the reflecting beveled edge at 45.0 degrees. Accordingly, the reflecting beveled edge redirects the reference beam 233 by 90.0 degrees, from along the y axis to along the z axis (as shown in FIGS. 3A and 3B). Persons skilled in the art will recognize that axes x and y reside in the plane of the page in FIG. 3A, as shown by first coordinate legend 202A, whereas axes x and z reside in the plane of the page in FIG. 3B, as shown by second coordinate legend 202B. The reference beam 233 therefore projects onto the knife-edge mirror 256 from out front of the plane of the page in FIG. 3B, and is thus not shown in FIG. 3B prior to reflecting off the knife-edge mirror 256.

The nascent signal beam 223 propagates through polarizing beam splitter (PBS) 239 to data encoding element 240. The data encoding element 240 of the first embodiment is an SLM that encodes data into the nascent signal beam 223 as an image of a pattern of light and dark pixels, thereby generating a signal beam 243. The SLM of the first embodiment system 200 is a Mohave model reflective, ferroelectric liquid crystal based SLM comprising 1216×1216 pixels operating in binary on-off mode. The pixel pitch is 10.7 µm×10.7 µm and the pixels occupy an area of 13.0 mm×13.0 mm. The Mohave SLM was formerly manufactured by Displaytech. Other embodiments comprise various SLMs including, but not limited to, transmissive SLMs and other reflective SLMs. In some embodiments, a data encoding element comprises other means for encoding data in a signal beam, the other means including, but not limited to, a data mask. The first embodiment system 200 further includes a detector 242 and variable half-wave plate 244, typically used to read reconstructed holographic images. The detector 242 and variable half-wave plate 244 are not required for recording holograms according to dynamic aperture holography, and some embodiments of dynamic aperture holography systems do not include detectors or variable half-wave plates.

After being modulated by data encoding element 240 to contain a pixel pattern image, the signal beam 243 is directed by the polarizing beam splitter 239 through a first 4F imaging assembly 254, which includes signal beam converging lenses 250. The signal beam 243 includes a Fourier plane of the SLM image residing within an aperture of aperture plate 255. The signal beam 243 emerges from the first 4F imaging assembly 254 and subsequently propagates past the knife-edge mirror 256, through objective lens 245.

Because the knife-edge mirror 256 resides in a path of signal beam 243, the mirror 256 obscures some of the signal beam 243. Accordingly, the knife-edge mirror 256 causes some occlusion of the image of the signal beam 243 as the beam 243 propagates past the mirror 256. However, because the knife-edge mirror 256 is only 500 µm thick (along the y axis), it typically occludes only 16 rows of pixels in the image in the signal beam 243, and the degradation is thus relatively minor. In the first embodiment device, 16 to 32 rows of pixels are rendered inactive in order to insure that pixels occluded by the knife-edge mirror contain no data. In addition, the occluded pixels can be omitted from the SLM data format so that the occluded pixels contain no data. Omission of the pixels results in relatively small loss of data recording capacity.

After passing the knife-edge mirror 256, the signal beam 243 passes through the objective lens 245, which directs the signal beam 243 into photosensitive recording medium 258. An interference pattern 248 is created where the signal beam 243 and the reference beam 233 interfere with each other. Where the interference pattern 248 resides within a photosensitive recording layer 260 of the photosensitive recording medium 258, a hologram is recorded. The photosensitive recording medium 258 typically comprises the photosensitive recording layer 260 sandwiched between two substrate structures 263. The substrate structures 263 usually comprise Zeonor® polyolefin thermoplastic, and the photosensitive recording layer typically includes photosensitive monomers in a polymeric matrix. Variations include substrates comprising polycarbonate. Suitable recording mediums are well known to persons of ordinary skill in the art, and embodiments of recording mediums are disclosed in U.S. Pat. Nos. 8,133,639 and 8,323,854, both of which are incorporated herein by reference.

A Method of Using Dynamic Aperture Holography

A first method 300 of using dynamic aperture holography to record multiple holograms is illustrated in FIGS. 4-9. The first method 300 is performed using the first embodiment dynamic aperture holographic system 200, illustrated in FIGS. 3A, 3B, and 5A-5C. The first method 300 and first embodiment system 200 are merely exemplary; other methods of using dynamic aperture holography, using various holographic systems, are within the scope of the present invention as set forth in the claims. The first method 300 comprises a first operation 301, illustrated in FIGS. 4 and 5A-5C, which includes projecting a first signal beam 243A through the first embodiment objective lens 245, and subsequently into the photosensitive recording medium 258 at a first signal beam angular aperture 270A.

Figure 5A:
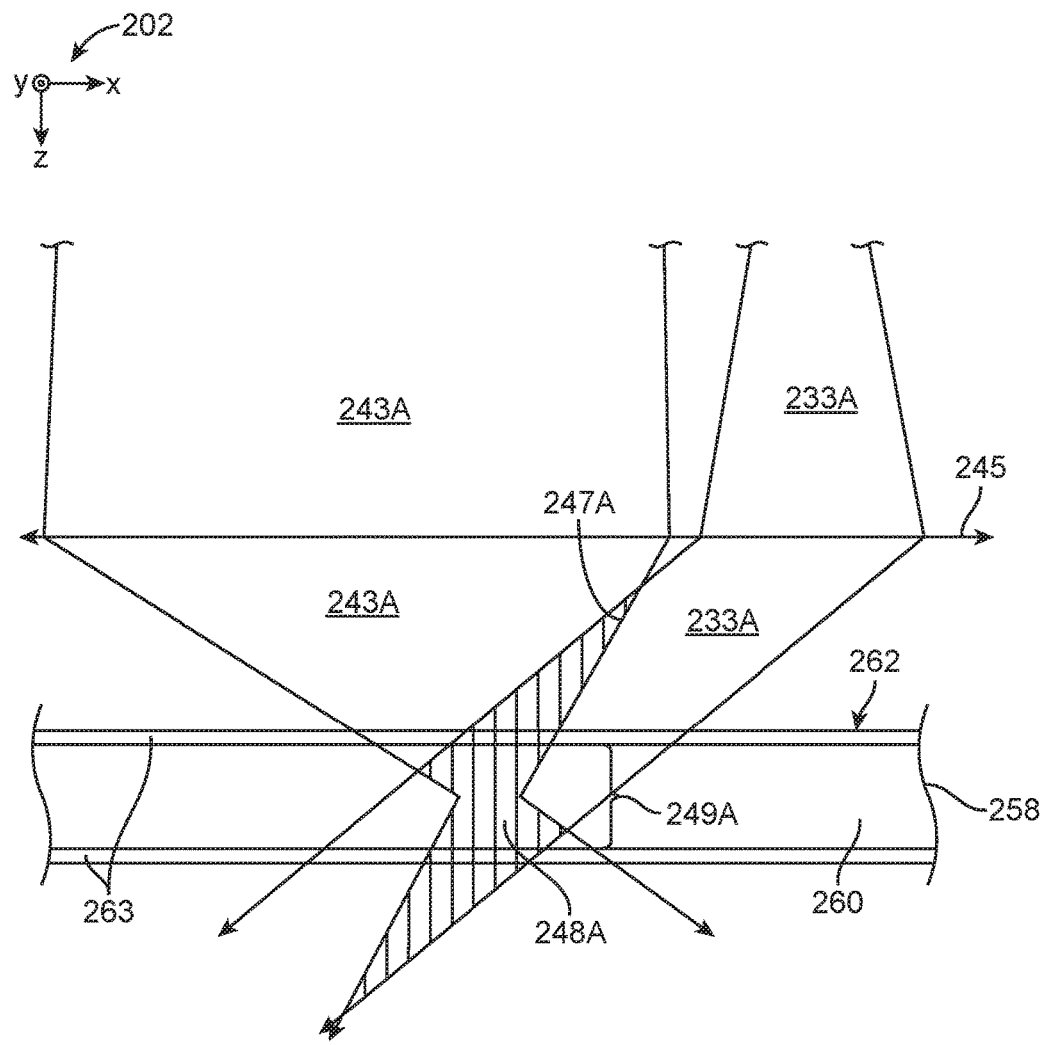
FIG. 5A illustrates a partial, side, cross-section view of a holographic data storage system including monocular architecture, wherein the system is configured to perform an embodiment of dynamic aperture holography.
Figure 5B:
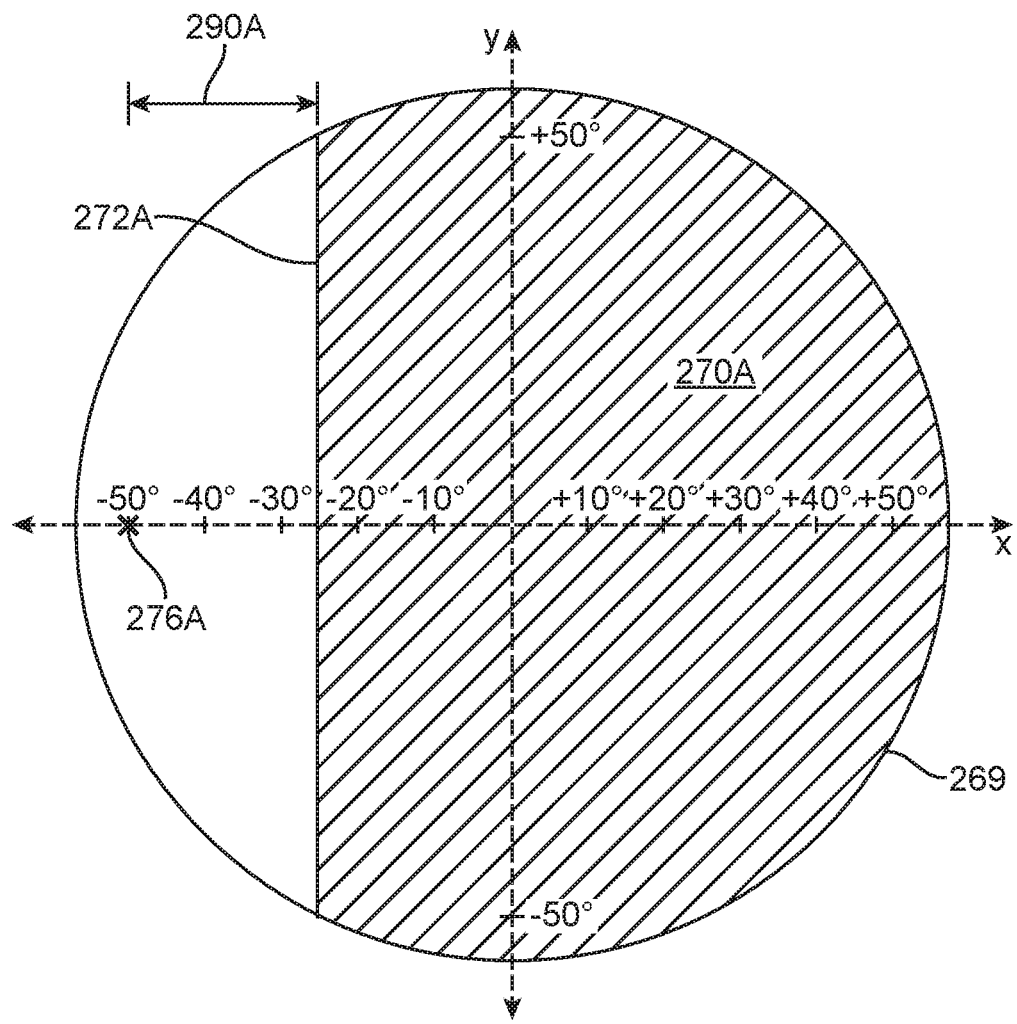
FIG. 5B illustrates beam angular apertures, as represented in a beam angular aperture map, for light beams whose cross-sections are illustrated in FIG. 5A.

As illustrated in FIG. 5B, which is an angular aperture map on which the first signal beam angular aperture 270A is illustrated as a two dimensional plot, the first signal beam angular aperture 270A consists of a set of angles of incidence ranging from −25.0 degrees to +58.2 degrees in x and from −58.2 degrees to +58.2 degrees in y. Only the x component of the first signal beam angular aperture observable is observable in FIG. 5A, where the y component projects out of the plane of the page. Both x and y components of beam angular apertures are represented on the angular aperture map shown in FIG. 5B. Circle 269 represents a maximum possible beam angular aperture using objective lens 245, which has a numerical aperture (NA) of 0.85 and a lens aperture angle of 116.4 degrees.

The first operation 301 further comprises projecting a first reference beam 233A through the first embodiment objective lens 245, and subsequently into the photosensitive recording medium 258 at a first reference beam angular aperture 276A. The first signal beam 243A and the first reference beam 233A interfere with each other to create a first interference pattern 248A, and a portion of the first interference pattern 248A residing within a photosensitive recording layer 260 of the recording medium 258 is recorded as a first hologram 249A in the photosensitive recording medium 258. As illustrated by the angular aperture map shown in FIG. 5B, the first reference beam angular aperture 276A consists of a set of angles at −50.0 degrees in x, and 0.0 degrees in y. In practice, the first reference beam angular aperture includes multiple angles of incidence clustered about a single angle defined as x=−50.0 degrees and y=0.0 degrees. However, because the first reference beam angular aperture is typically controlled with great precision, the multiple angles are clustered very tightly (typically, but not necessarily, plus or minus 0.002 degrees), and for the purposes of this specification and appended claims can therefore be represented by the single angle at x=−50.0 degrees and y=0.0 degrees.

As best seen in FIG. 5B, the first signal beam angular aperture 270A is separated from the first reference beam angular aperture 276A by a first separation angle 290A of 25.0 degrees where the first signal and reference beam angular apertures are closest to each other. Separation angle refers to degrees of separation between a reference beam angular aperture and a signal beam angular aperture, where the two beam angular apertures are at their closest. Where a reference beam angular aperture and a signal beam angular aperture are not separated from each other, i.e. they share at least one common angle of incidence (common in both x and y), the reference beam and signal beam angular apertures do not have a separation angle, and are said to overlap. Accordingly, for the purposes of this specification and appended claims, separation angles, where they exist, have positive values.

For the first signal beam angular aperture 270A and the first reference beam angular aperture 276A, their closest angles reside at: x=−50.0 degrees and y=0.0 degrees for the first reference beam angular aperture, and x=−25.0 and y=0.0 degrees for the first signal beam angular aperture. An edge of the first signal beam angular aperture that is closest to the first reference beam angular aperture 276A is referred to as a first signal beam angular aperture near edge 272A. The first signal beam angular aperture near edge 272A illustrated in FIG. 5B consists of angles of incidence at x=−25.0 and ranging from −52.6 degrees to +52.6 degrees in y, corresponding to a first signal beam periphery 247A, shown in FIG. 5A.

It has been determined that the first embodiment dynamic aperture holography system 200 has a predetermined minimum separation angle of 22.5 degrees. In some other embodiments, the minimum separation angle is typically 10.0 degrees, more typically 15.0 degrees, still more typically 20.0 degrees, and most typically between 25.0 and 30.0 degrees. For the purposes of this specification and appended claims, a predetermined separation angle must be positive.

The first method 300 further comprises a second operation 302, illustrated in FIGS. 4, 6A-C. The second operation 302 includes projecting a second signal beam 243B through the first embodiment objective lens 245, and subsequently into the photosensitive recording medium 258 at a second signal beam angular aperture 270B. As illustrated by an angular aperture map in FIG. 6B, the second signal beam angular aperture 270B consists of a set of angles ranging from +20.0 degrees to +58.2 degrees in x and from −54.7 degrees to +54.7 degrees in y. Only the x component of beam angular apertures are observable in FIG. 6A, where the y component projects out of the plane of the page. Both x and y components of beam angular apertures are represented on the angular aperture map shown in FIG. 6B. Circle 269 represents a maximum possible beam angular aperture using objective lens 245.

The second operation 302 further comprises projecting a second reference beam 233B through the first embodiment objective lens 245, and subsequently into the photosensitive recording medium 258 at a second reference beam angular aperture 276B. The second signal beam 243B and second reference beam 233B interfere with each other to create a second interference pattern 248B, and a portion of the second interference pattern 248B residing within the photosensitive recording layer 260 is recorded as a second hologram 249B in the photosensitive recording medium 258. The second hologram 249B at least partially overlaps the first hologram 249A where the first and second holograms share a common volume in the photosensitive recording layer 260. In some embodiments the first and second holograms overlap completely, and in some embodiments the first and second holograms do not overlap. A position of the photosensitive recording medium 258 relative to the objective lens 245 is typically, but not necessarily, the same for recording the first hologram 249A and for recording the second hologram 249B.

Figure 6A:
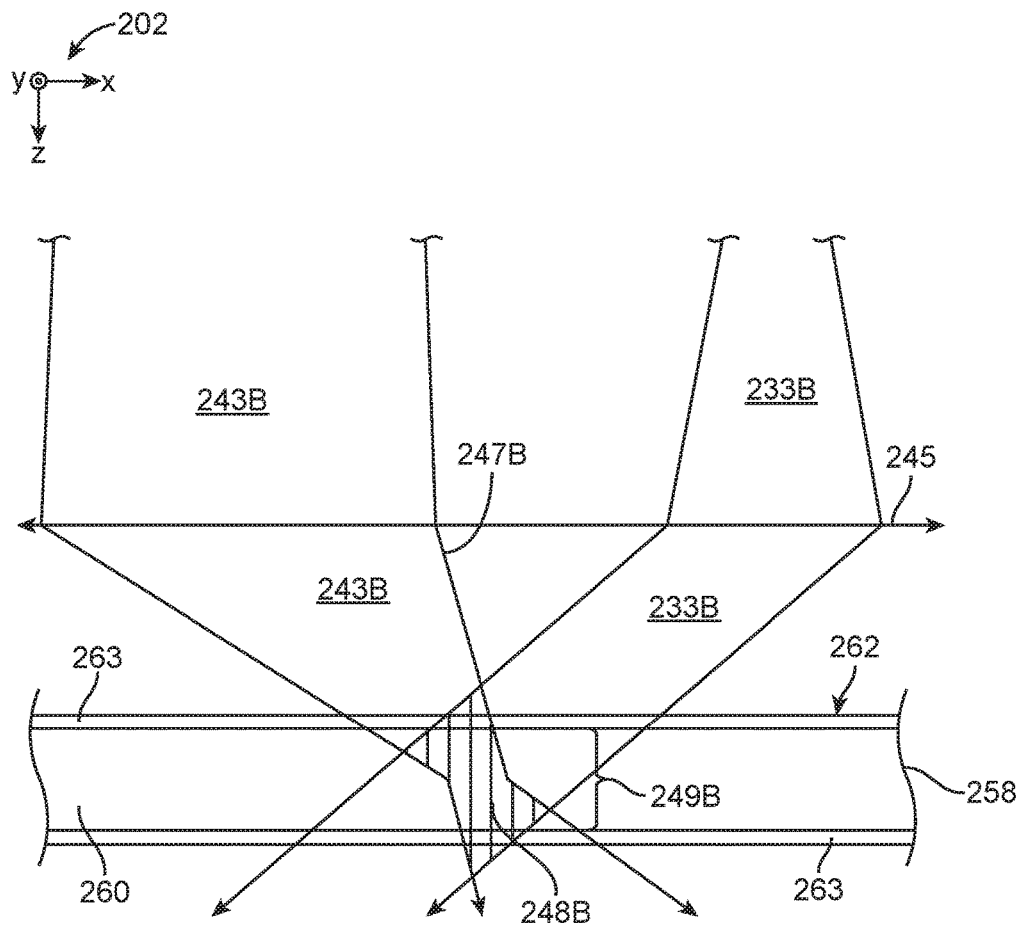
FIG. 6A illustrates a partial, side, cross-section view of a holographic data storage system including monocular architecture, wherein the system is configured to perform an embodiment of dynamic aperture holography.
Figure 6B:
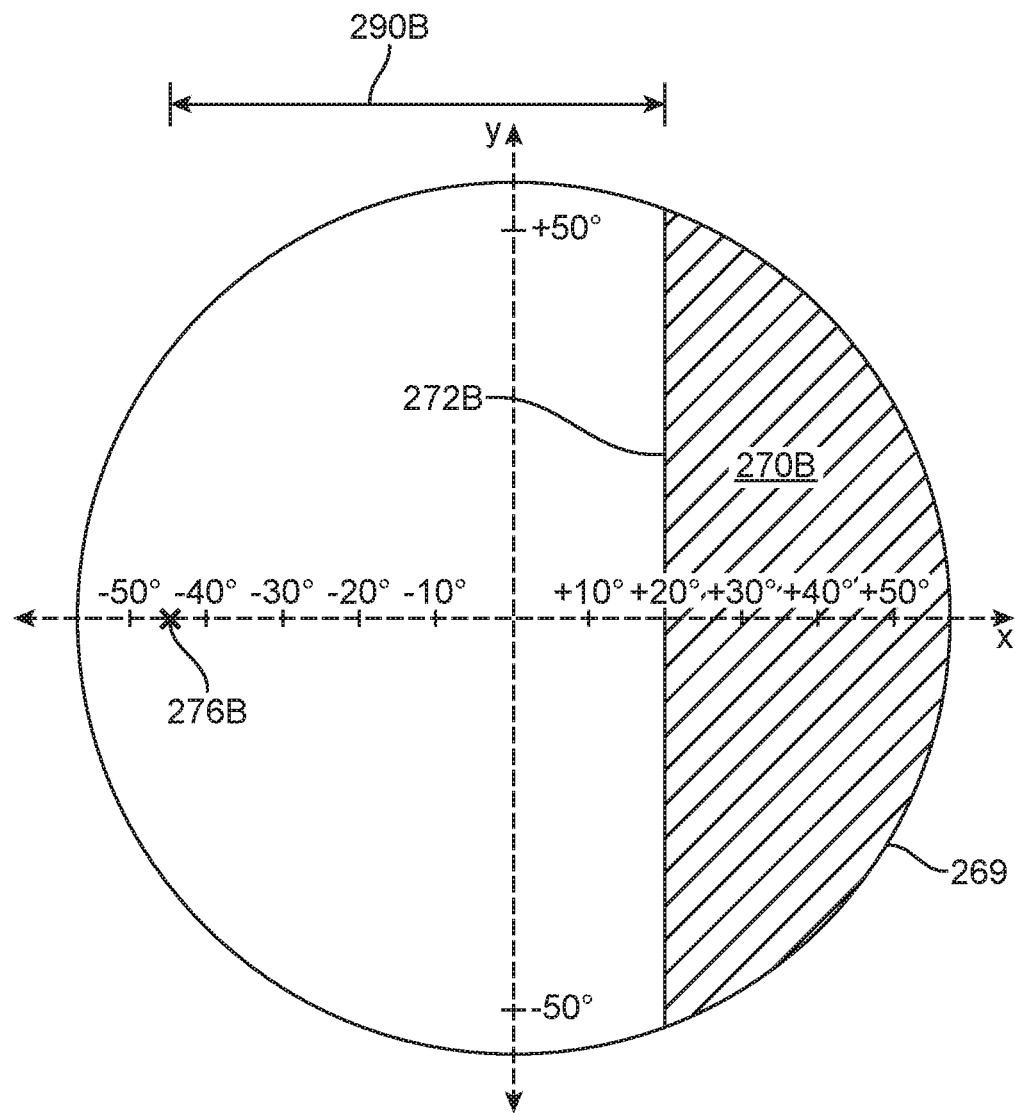
FIG. 6B illustrates beam angular apertures, as represented in a beam angular aperture map, for light beams whose cross-sections are illustrated in FIG. 6A.

As illustrated by the angular aperture map shown in FIG. 6B, the second reference beam angular aperture 276B consists of a set of angles at −45.0 degrees in x, and 0.0 degrees in y. In practice, the second reference beam angular aperture includes multiple angles clustered about a single angle defined as x=−45.0 degrees and y=0.0 degrees. However, as described above with respect to the first reference beam angular aperture, for the purposes of this specification and appended claims, the multiple angles can be represented by the single angle at x=−45.0 degrees and y=0.0 degrees.

As best seen in FIG. 6B, the second signal beam angular aperture 270B is separated from the second reference beam angular aperture 276B by a second separation angle 290B of 65 degrees where the second signal and reference beam angular apertures are closest to each other. For the second signal beam angular aperture and the second reference beam angular aperture, their closest angles reside at y=0.0 and x=−45.0 degrees for the second reference beam angular aperture, and y=0.0 and x=+20.0 degrees for the second signal beam angular aperture. The second signal beam angular aperture near edge 272B resides at +20.0 degrees in x and from −54.7 degrees to +54.7 degrees in y. The second signal beam angular aperture near edge 272B illustrated in FIG. 6B indicates angles of incidence corresponding to a second signal beam periphery 247B, shown in FIG. 6A.

A quantitative difference between two separation angles can be referred to as a separation angle dissimilarity. Accordingly, a separation angle dissimilarity between the first separation angle 290A, which is 25.0 degrees, and the second separation angle 290B, which is 65.0 degrees, is 40.0 degrees. Separation angle dissimilarity is an absolute value of a difference between two separation angles, and thus must be a non-negative number.

It has been determined that the first embodiment dynamic aperture holography system 200 has a predetermined minimum separation angle dissimilarity of 35.0 degrees. The minimum separation angle dissimilarity facilitates interleaving additional holograms in a stack of multiplexed holograms, as explained below. In some other embodiments, the minimum separation angle dissimilarity is typically at least 20.0 degrees, more typically at least 25.0 degrees, still more typically at least 30.0 degrees, and most typically between 35.0 and 55.0 degrees. In some embodiments, the minimum separation angle dissimilarity is between 15 degrees and 100 degrees.

The first method 300 further comprises a third operation 303, illustrated in FIGS. 4, and 7A-7C. The third operation includes projecting a third signal beam 243C through the first embodiment objective lens 245, and subsequently into the photosensitive recording medium 258 at a third signal beam angular aperture 270C. As illustrated by an angular aperture map of FIG. 7B, the third signal beam angular aperture 270C consists of a set of angles ranging from +5.0 degrees to +58.2 degrees in x and from −58.0 degrees to +58.0 degrees in y. The x component of beam angular apertures can be observed in FIG. 7A, where the y component projects out of the plane of the page. Both x and y components of beam angular apertures are illustrated in 7B.

The third operation 303 further comprises projecting a third reference beam 233C through the first embodiment objective lens 245, and subsequently into the photosensitive recording medium 258 at a third reference beam angular aperture 276C. The third signal beam 243C and third reference beam 233C interfere with each other to create a third interference pattern 248C, and a portion of the third interference pattern 248C residing within the photosensitive recording layer 260 is recorded as a third hologram 249C in the photosensitive recording layer 260. The third hologram 249C at least partially overlaps the second hologram 249B where the second and third holograms share a common volume in the photosensitive recording layer 260. In some embodiments the second and third holograms overlap completely, and in some embodiments the second and third holograms do not overlap at all. A position of the photosensitive recording medium 258 relative to the objective lens 245 is typically, but not necessarily, the same for recording the second hologram and for recording the third hologram.

Figure 7A:
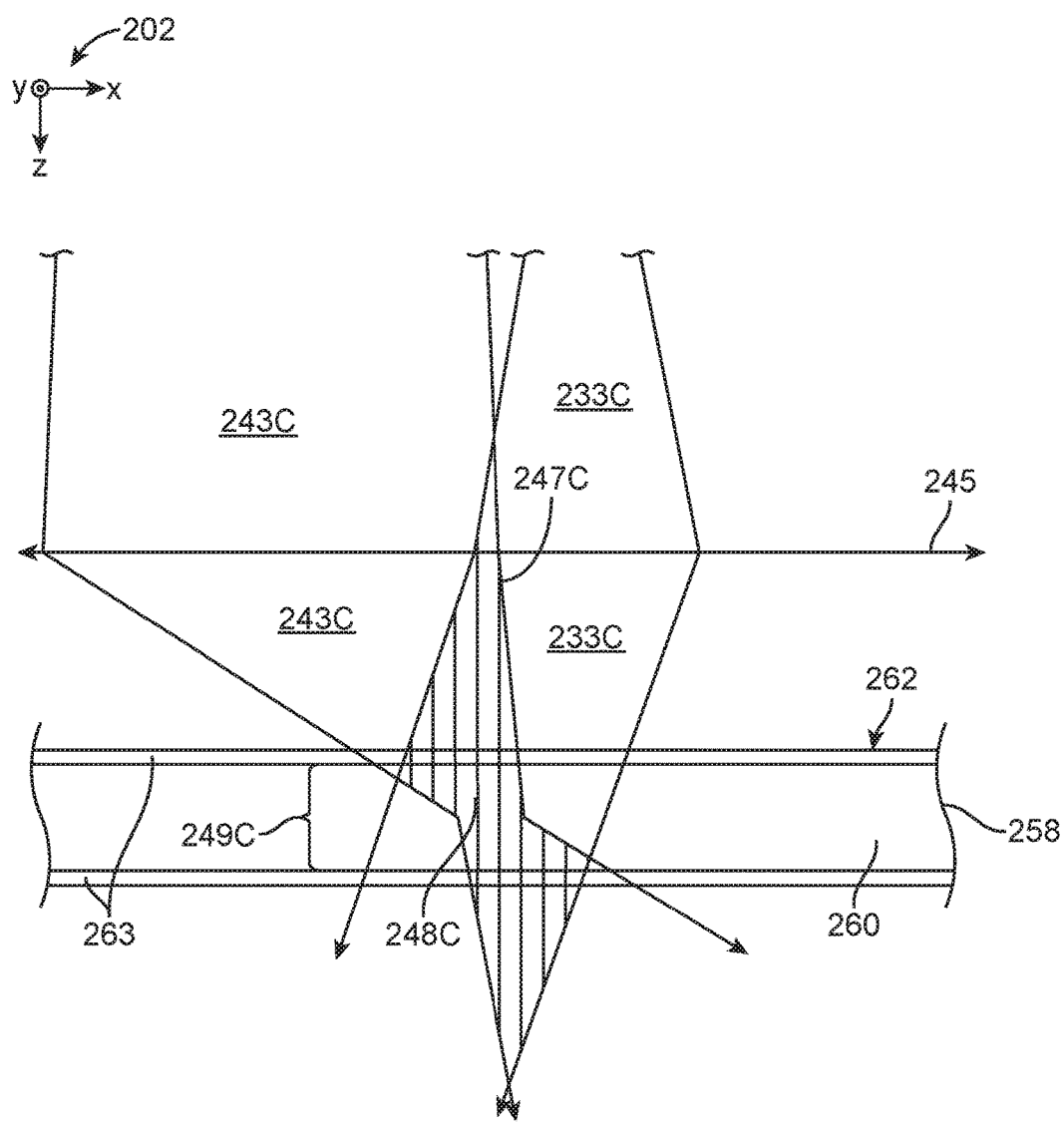
FIG. 7A illustrates a partial, side, cross-section view of a holographic data storage system including monocular architecture, wherein the system is configured to perform an embodiment of dynamic aperture holography.
Figure 7B:
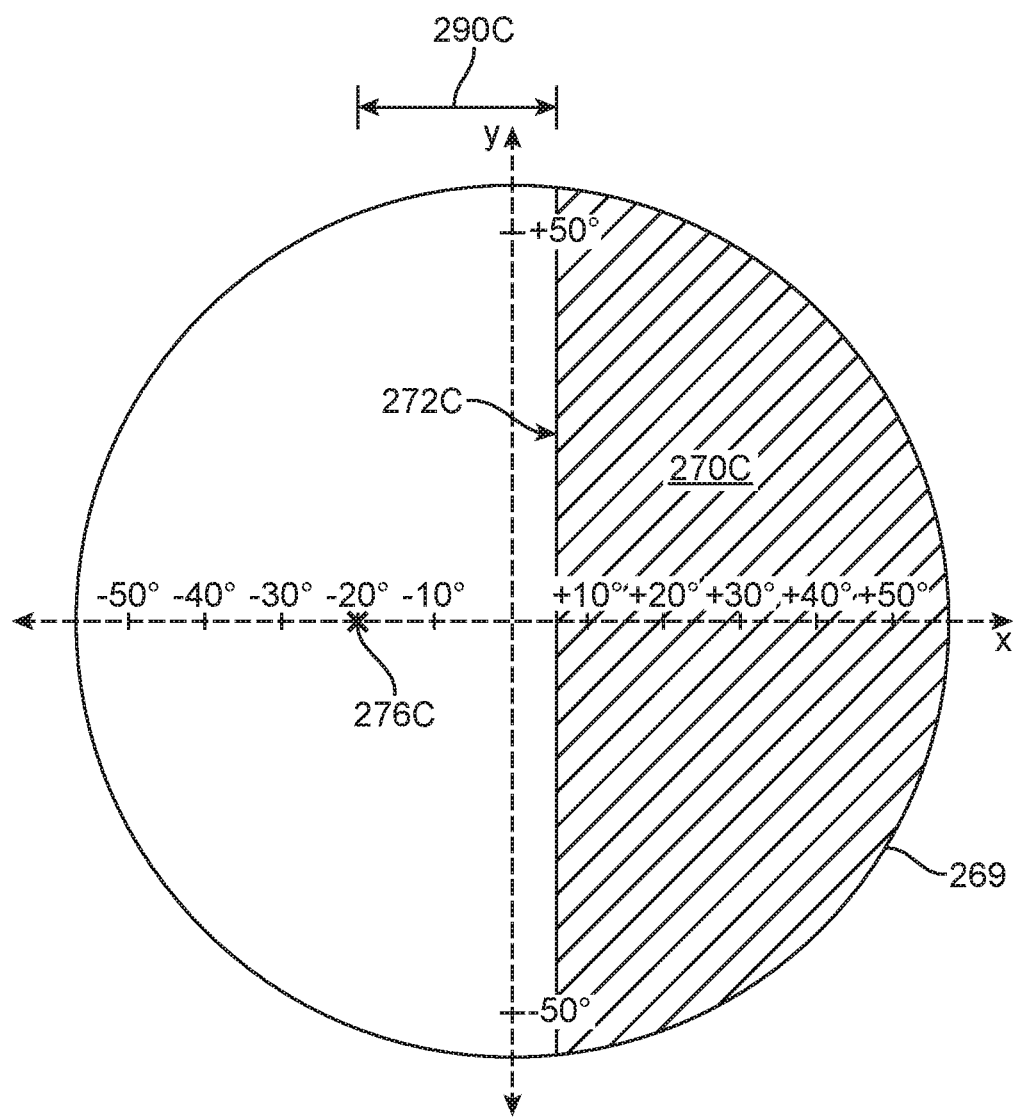
FIG. 7B illustrates beam angular apertures, as represented in a beam angular aperture map, for light beams whose cross-sections are illustrated in FIG. 6A.

As illustrated by the angular aperture map shown in FIG. 7B, the third reference beam angular aperture 276C consists of a set of angles at −20.0 degrees in x, and 0.0 degrees in y. Although the third reference beam angular aperture includes multiple angles, the multiple angles can be represented by the single angle at x=−20.0 degrees and y=0.0 degrees, as described above with respect to the first and second reference beam angular apertures.

As best seen in FIG. 7B, where the third signal beam angular aperture 270C is separated from the third reference beam angular aperture 276C by a third separation angle 290C of 25.0 degrees where the third signal and reference beam angular apertures are closest to each other. Thus the third separation angle 290C and the first separation angle 290A (see FIG. 5B) are substantially equal to each other. The third signal beam angular aperture near edge 272C resides at +5.0 degrees in x and from −58.0 to +58.0 degrees in y. The third signal beam angular aperture near edge 272C illustrated in FIG. 7B indicates angles of incidence corresponding to a third signal beam periphery 247C, shown in FIG. 7A.

Figure 8A:
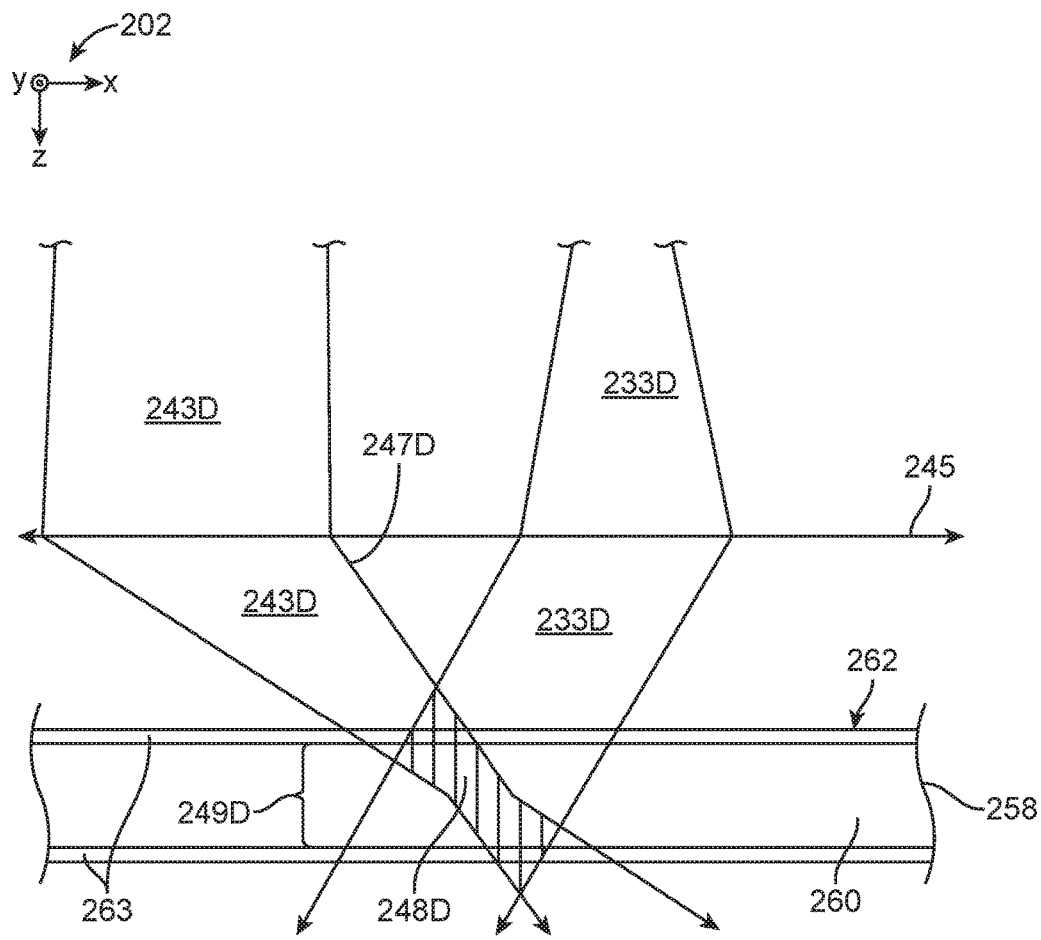
FIG. 8A illustrates a partial side, cross-section view of a holographic data storage system including monocular architecture, wherein the system is configured to perform an embodiment of dynamic aperture holography.

The first method 300 further comprises a fourth operation 304, illustrated in FIGS. 4, and 8A-8C. The fourth operation 304 includes projecting a fourth signal beam 243D through the first embodiment objective lens 245, and subsequently into the photosensitive recording medium 258 at a fourth signal beam angular aperture 270D. As illustrated by an angular aperture map of FIG. 8B, the fourth signal beam angular aperture 270D consists of a set of angles ranging from +35.0 degrees to +58.2 degrees in x and from −46.5 degrees to +46.5 degrees in y. Only the x component of beam angular apertures is illustrated in FIG. 8A, where the y component projects out of the plane of the page. Both x and y components of beam angular apertures are represented on the angular aperture map shown in FIG. 8B. Circle 269 represents a maximum possible beam angular aperture using objective lens 245.

The fourth operation 304 further comprises projecting a fourth reference beam 233D through the first embodiment objective lens 245, and subsequently into the photosensitive recording medium 258 at a fourth reference beam angular aperture 276D. The fourth signal beam 243D and fourth reference beam 233D interfere with each other to create a fourth interference pattern 248D, and portion of the fourth interference pattern 248D residing within the photosensitive recording layer 260 is recorded as a fourth hologram 249D in the photosensitive recording layer 260. The fourth hologram 249D at least partially overlaps the third hologram 249C where the third and fourth holograms share a common volume in the photosensitive recording layer 260. Moreover, each of the first, second, third, and fourth holograms at least partially overlap all others of the first, second, third, and fourth holograms, and thus share a volume common to all of the first, second, third, and fourth holograms in the photosensitive recording medium 258. In some embodiments the third and fourth holograms overlap completely, and in some embodiments the third and fourth holograms do not overlap. A position of the photosensitive recording medium 258 relative to the objective lens 245 is typically, but not necessarily, the same for recording the third hologram and for recording the fourth hologram.

Figure 8B:
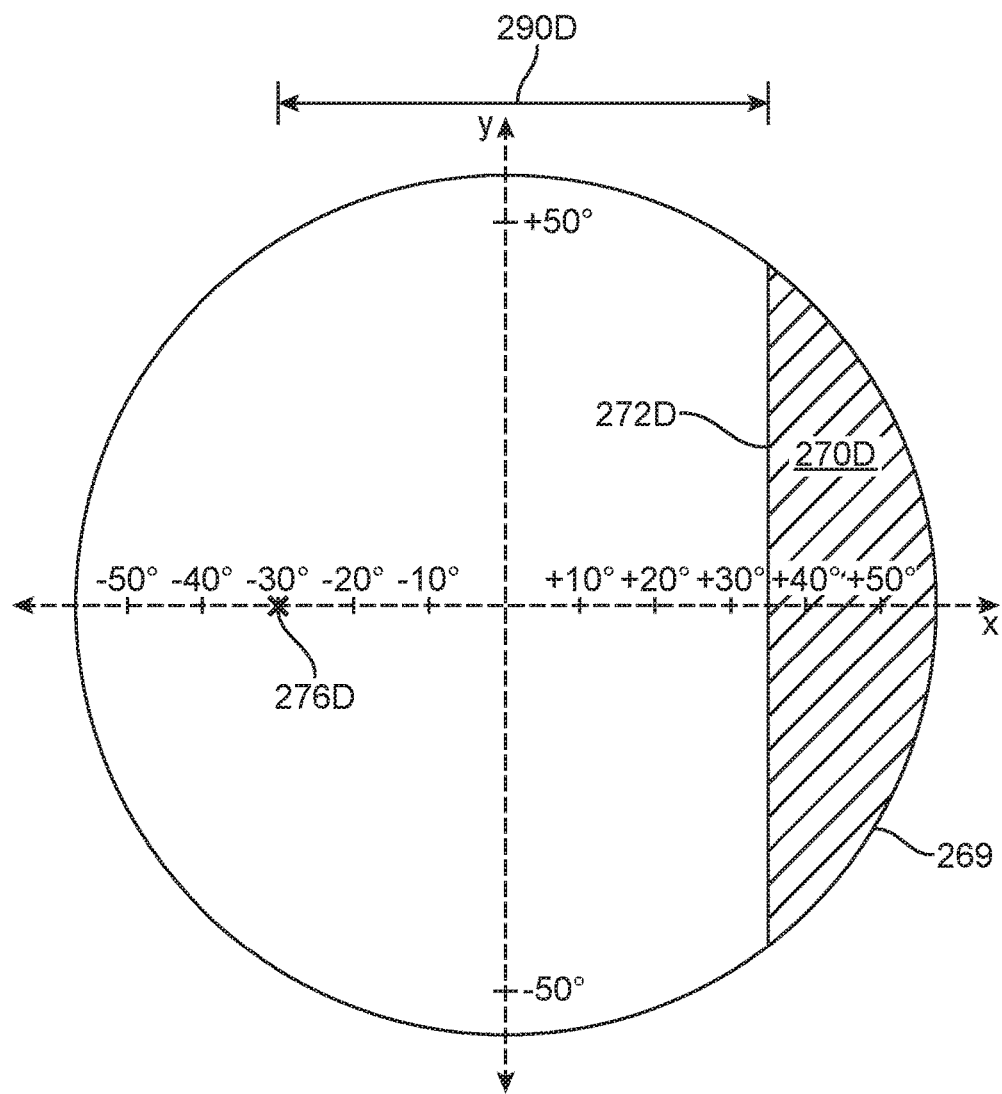
FIG. 8B illustrates beam angular apertures, as represented in a beam angular aperture map, for light beams whose cross-sections are illustrated in FIG. 8A.

As illustrated by the angular aperture map shown in FIG. 8B, the fourth reference beam angular aperture 276D consists of a set of angles at −30.0 degrees in x, and 0.0 degrees in y. Although the fourth reference beam angular aperture includes multiple angles, the multiple angles can be represented by the single angle at x=−30.0 degrees and y=0.0 degrees, as described above with respect to the first, second, and third reference beam angular apertures.

As best seen in FIG. 8B, the fourth signal beam angular aperture 270D is separated from the fourth reference beam angular aperture 276D by a fourth separation angle 290D of 65.0 degrees where the fourth signal and reference beam angular apertures are closest to each other. The fourth separation angle 290D and the second separation angle 290B (see FIG. 6B) are substantially equal to each other. The fourth signal beam angular aperture near edge 272D resides at +35.0 degrees in x and from −46.5 to +46.5 degrees in y. The fourth signal beam angular aperture near edge 272D illustrated in FIG. 8B indicates angles of incidence corresponding to a fourth signal beam periphery 247D, shown in FIG. 8A.

Figure 9:
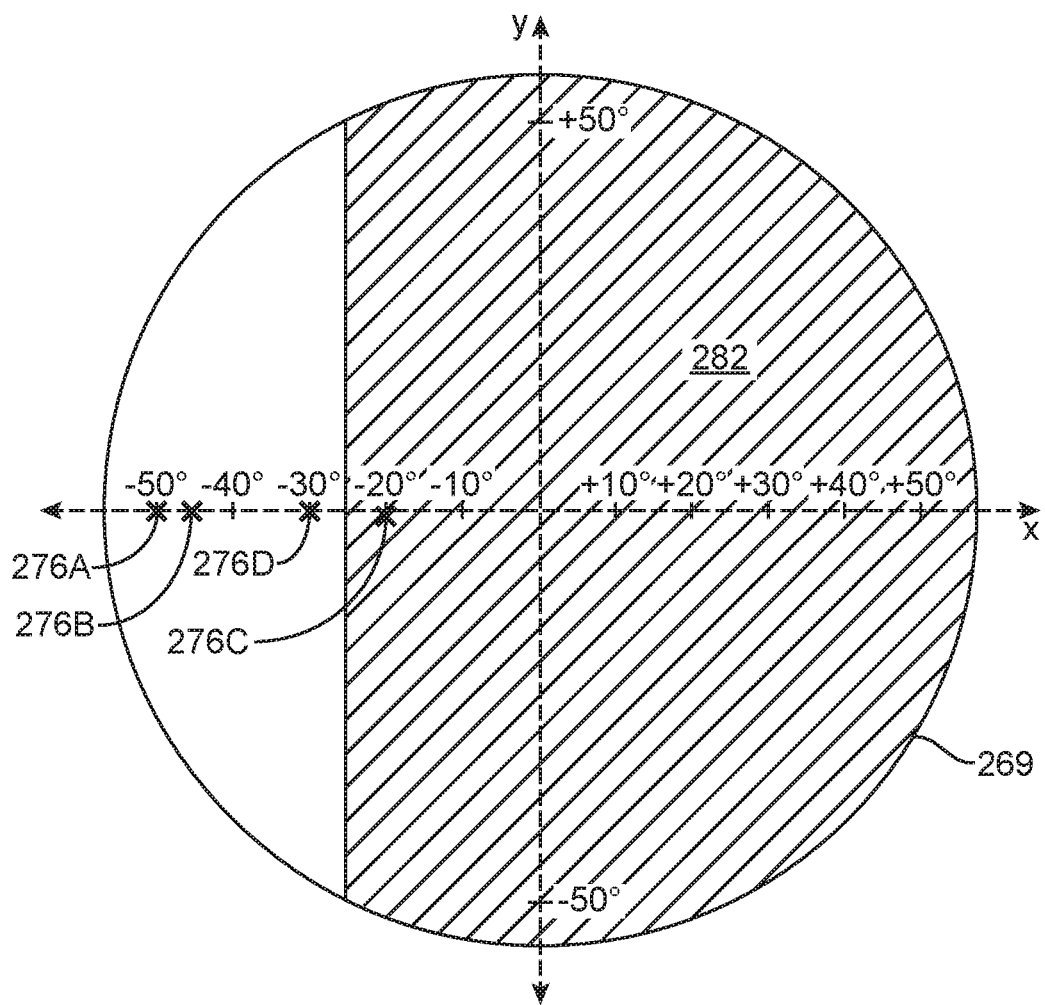
FIG. 9 illustrates beam angular apertures, as represented in a beam angular aperture map, for light beams whose cross-sections are illustrated in FIGS. 5A, 6A, 7A, and 8A, and which individual angular apertures are illustrated in FIGS. 5B, 6B, 7B, and 8B.

FIG. 9 is illustrates an angular aperture map on which the first reference beam angular aperture 276A, the second reference beam angular aperture 276B, the third reference beam angular aperture 276C, and the fourth reference beam angular aperture 276D are represented. A range of reference beam angular apertures covered by the first, second, third, and fourth reference beam angular apertures can be referred to as a reference beam angular aperture locus. The range of reference beam angular apertures for the first, second, third, and fourth reference angular apertures resides at 0 degrees in y and extends from −50.0 degrees to −20.0 degrees in x.

Signal beam angular aperture locus 282 is a set of angles that is a union of all angles in the first signal beam angular aperture 270A (see FIG. 5B), the second signal beam angular aperture 270B (see FIG. 6B), the third signal beam angular aperture 270C (see FIG. 7B), and the fourth signal beam angular aperture 270D (see FIG. 8B). The signal beam angular aperture locus 282 is identical to (i.e. equal in size, shape, and position) to the first signal beam angular aperture 270A, because all angles of the second, third, and fourth signal beam angular apertures 270B, 270C, 270D are included in the set of angles that make up the first signal beam angular aperture 270A. The signal beam angular aperture locus 282 can be referred to as a composite signal beam angular aperture.

As readily seen in FIG. 9, none of the second, third, or fourth reference beam angular apertures 276B, 276C, 276D have separation angles, with respect to the signal beam angular aperture locus 282, that are equal to or greater than the predetermined minimum separation angle for the first embodiment dynamic aperture holographic system 200, which is 22.5 degrees. Accordingly, because the signal beam angular aperture locus 282 and the first signal beam angular aperture 270A (see FIG. 5B) are identical, none of the second, third, or fourth reference beam angular apertures 276B, 276C, 276D have separation angles equal to or greater than the predetermined minimum separation angle (22.5 degrees) with respect to the first signal beam angular aperture 270A.

This illustrates that were the first signal beam angular aperture 270A to be used in the absence of dynamic aperture holography, second, third, and fourth reference beam angular apertures 276B, 276C, 276D would be unavailable for use in recording holograms while maintaining the minimum separation angle of 22.5 degrees. Of course, another approach would be to use a static signal angular aperture, for example the third signal dynamic aperture 270C (see FIG. 7B), which would enable maintaining the minimum separation angle of 22.5 degrees with all of the first, second, third, and fourth reference beam dynamic apertures. However, data capacity for a signal beam is directly proportional to signal beam angular aperture size, and the latter approach described above with respect to third signal dynamic aperture 270C would thus result in decreased data density compared to the first method 300 of using dynamic aperture holography.

The first, second, third, and fourth reference beams 233A, 233B, 233C, and 233D are typically adjusted so that their respective first, second, third, and fourth reference beam angular apertures 276A, 276B, 276C, and 276D differ from each other, by rotating the beam directing device 227 to change angles at which the reference beams encounter objective lens 245. The first, second, third, and fourth signal beams 243A, 243B, 243C, and 243D are typically adjusted so that their respective first, second, third, and fourth signal beam angular apertures 270A, 270B, 270C, and 270D differ from each other, by changing an active portion and an inactive portion of the of the data encoding element 240, as described below.

Referring now to FIGS. 5C, 6C, 7C, and 8C, a perimeter of the first embodiment objective lens 245 is superimposed on an outline of the first data encoding element 240. Light from an outside area of the data encoding element 240, the outside area residing outside the perimeter of the objective lens 245 as depicted in FIGS. 5C, 6C, 7C, and 8C, typically does not reach the objective lens 245 or photosensitive recording medium 258. Accordingly, the outside area is generally not capable of transmitting recordable data, and is thus typically maintained in an inactive status regardless of whether, or what, data is being encoded into a signal beam. Conversely, light projecting from an inside area of the data encoding element 240, can transmit data that is recordable in the photosensitive recording medium. The inside area can therefore be in an active status, whereupon it transmits encoded data, or in the inactive status, whereupon it does not transmit encoded data.

Figure 5C:
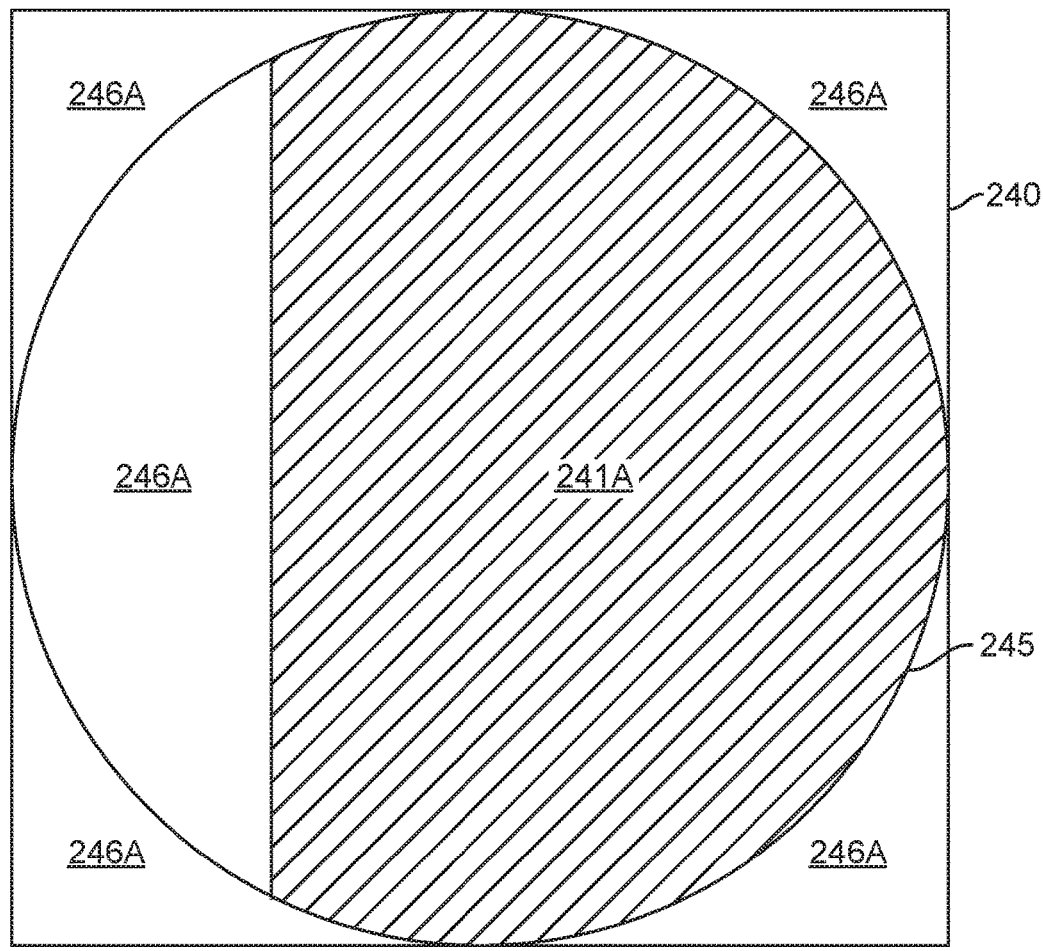
FIG. 5C illustrates an outline of an objective lens superimposed on an outline of a data encoding element, corresponding to the illustrations of FIGS. 5A and 5B.

A first active portion 241A (shaded) of the data encoding element 240, and a first inactive portion 246A are illustrated in FIG. 5C. The first active portion 241A shown in FIG. 5C corresponds to the first signal beam 243A and first signal beam angular aperture 270A illustrated in FIGS. 5A and 5B. Pixels in the first active portion 241A are active, and are therefore available to be in a light or dark state depending on data being transmitted. Consequently, the first active portion 241A includes an irregular pattern of light and dark pixels representing data encoded therein. A relatively large, regular, contiguous blocks of dark pixels typically does not occur in the first active portion 241A. Conversely, pixels in the first inactive portion 246A are in a dark state regardless of data being transmitted, and make no meaningful contribution to the first signal beam 243A, the first interference pattern 248A, or first hologram 249A recorded in the photosensitive recording medium 258. The first inactive portion typically consists of a relatively large, contiguous block of dark pixels.

Although the beam angular aperture map illustrated in FIG. 5B and the depiction of active and inactive portions illustrated in FIG. 5C appear similar to each other, the two Figures show different elements. FIG. 5B illustrates beam angular apertures for the first signal beam and the first reference beam, whereas FIG. 5C identifies the first active area 241A of the data encoding element 240 that generates the first signal beam 243A (see FIG. 5A).

Figure 6C:
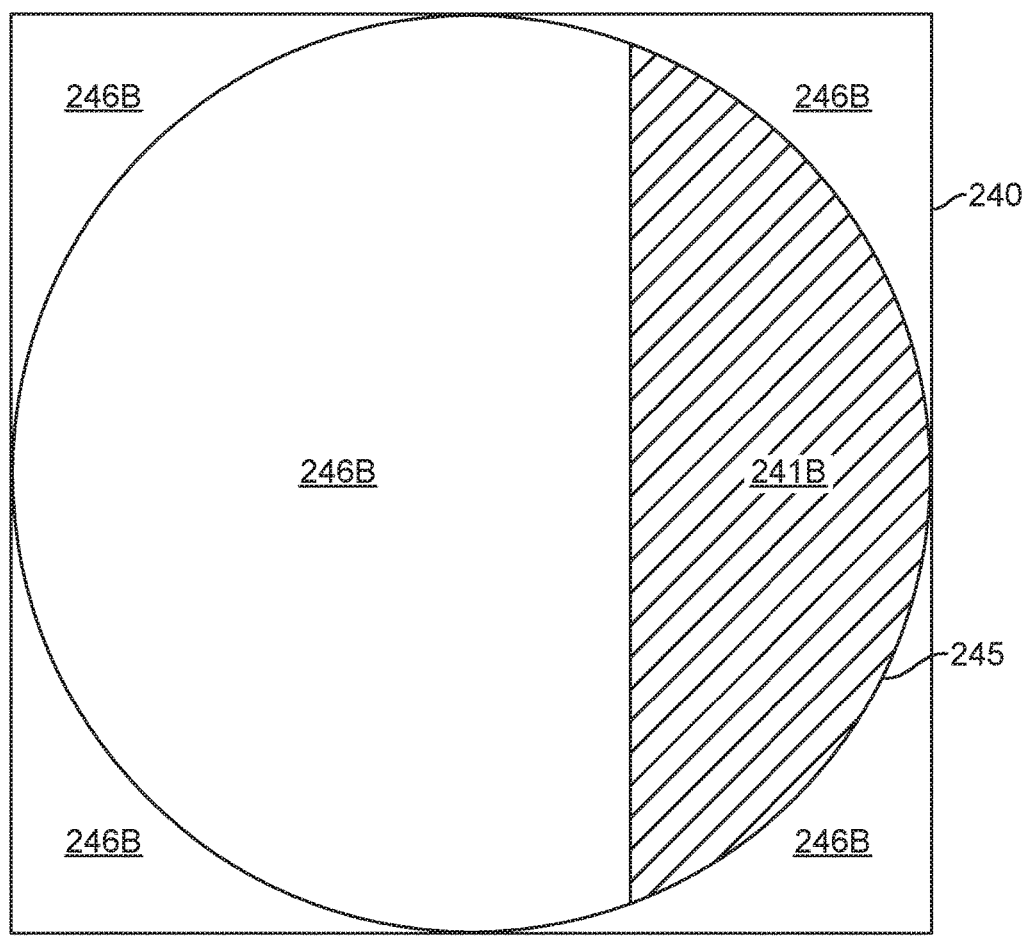
FIG. 6C illustrates an outline of an objective lens superimposed on an outline of a data encoding element, corresponding to the illustrations of FIGS. 6A and 6B.

A second active portion 241B of the data encoding element 240, and a second inactive portion 246B are illustrated in FIG. 6C. The second active portion 241B corresponds to the second signal beam 243B and the second signal beam angular aperture 270B illustrated in FIGS. 6A and 6B, respectively. Pixels in the second active portion 241B are active, and the second active portion 241B therefore includes an irregular pattern of light and dark pixels representing data encoded therein. Conversely, pixels in the second inactive portion 246B are in a dark state regardless of data being transmitted, and make no meaningful contribution to the second signal beam 243B. A difference between the first signal beam angular aperture 270A and the second signal beam angular aperture 270B is due to a difference between the first signal beam active area 241A and the second signal beam active area 241B. In some embodiments, signal beam angular apertures can be modified by occluding a portion of a nascent signal beam such that a portion of a data encoding element becomes inactive because the nascent signal beam does not shine thereon. Similarly, some embodiments of signal beam angular apertures are modified by occluding a portion of a signal beam.

Figure 7C:
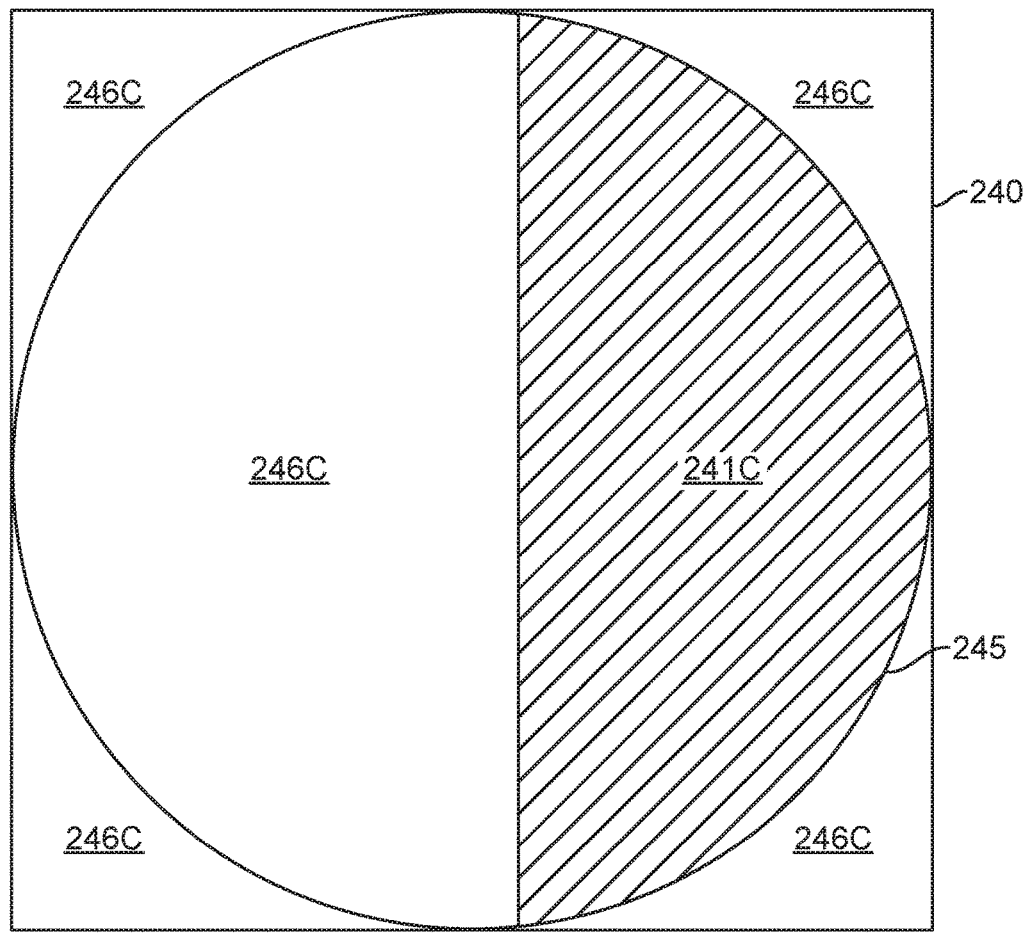
FIG. 7C illustrates an outline of an objective lens superimposed on an outline of a data encoding element, corresponding to the illustrations of FIGS. 7A and 7B.

A third active portion 241C of the data encoding element 240, and a third inactive portion 246C are illustrated in FIG. 7C. The third active portion 241C corresponds to the third signal beam 243C and the third signal beam angular aperture 270C illustrated in FIGS. 7A and 7B, respectively. Pixels in the third active portion 241C are active, and the third active portion 241C therefore includes an irregular pattern of light and dark pixels representing data encoded therein. Conversely, pixels in the third inactive portion 246C are in a dark state regardless of data being transmitted, and make no meaningful contribution to the third signal beam 243C.

Figure 8C:
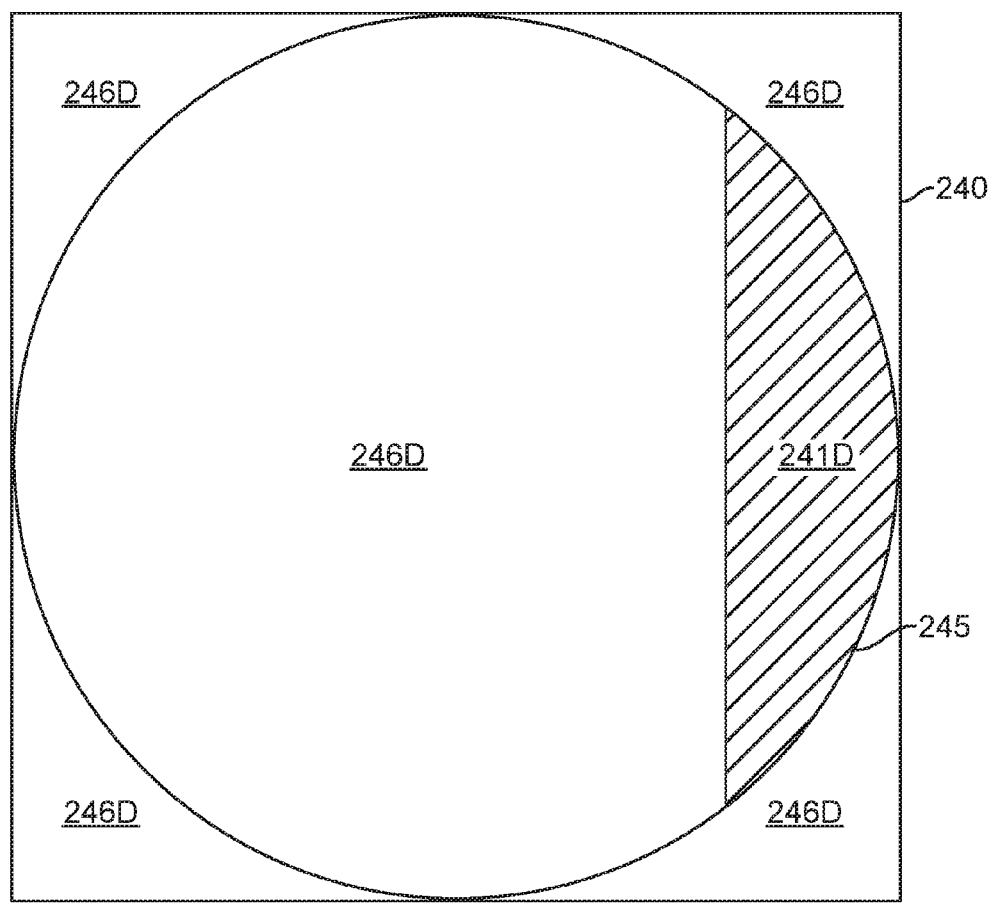
FIG. 8C illustrates an outline of an objective lens superimposed on an outline of a data encoding element, corresponding to the illustrations of FIGS. 8A and 8B.

A fourth active portion 241D of the data encoding element 240, and a fourth inactive portion 246D are illustrated in FIG. 8C. The fourth active portion 241D corresponds to the fourth signal beam 243D and the fourth signal beam angular aperture 270D illustrated in FIGS. 8A and 8B, respectively. Pixels in the fourth active portion 241D are active, and the fourth active portion 241C therefore includes an irregular pattern of light and dark pixels representing data encoded therein. Conversely, pixels in the fourth inactive portion 246D are in a dark state regardless of data being transmitted by the fourth signal beam 243D, and therefore make no meaningful contribution to the fourth signal beam 243D. Differences among first, second, third, and fourth signal beams and their respective signal beam angular apertures are attributable to differences among first, second, third, and fourth active portions of the data encoding element 240.

The data encoding element 240 (a reflective SLM) of the first embodiment dynamic aperture holography system 200, as illustrated in FIG. 3B, maintains pixels in a light or dark state according to polarity of light reflected therefrom. The SLM pixels typically work by maintaining or changing polarity of reflected light in response to voltage applied to the pixels. Accordingly, an SLM pixel in a dark state reflects light polarized so as to pass back through the PBS 239 along the transit path (but in the opposite direction) as the incoming nascent signal beam 223. Thus light from the dark state pixels is directed away from the photosensitive recording medium 258, and is "dark" to the medium 258. The inactive portion 246 of the data encoding element 240, wherein all pixels are in a dark state regardless of the data encoded in the pixel pattern of the active portion 241, is illustrated in FIGS. 3B and 3C. All light reflected by the pixels in the inactive portion 246 passes back through the PBS 239 along the path of the nascent signal beam 223.

Conversely, an SLM pixel in a light state typically rotates polarity of reflected light such that the light is deflected by the PBS 239 toward the objective lens 245 and the photosensitive recording medium 258. The active portion 241 of the data encoding element 240, within which resides a pattern of light and dark pixels, is illustrated in FIG. 3B. Light rays reflected by dark pixels in the active portion 241 of the data encoding element pass back through the PBS 239 along the transit path of the nascent signal beam 223, whereas light rays reflected by light pixels in the active portion 241 are deflected toward the objective lens 245 and the photosensitive recording medium 258.

In a variation of the first embodiment dynamic aperture holographic system 200 illustrated in FIG. 3C, pixels of the inactive portion 246 of the data encoding element 240 are made dark by use of an occluder 225 that blocks a portion of the nascent signal beam 223 from reaching the data encoding element 240. The occluder 225 of the dynamic aperture holographic system 200 shown in FIG. 3C is a straight-edge shutter disposed at an image plane residing between the beam splitter 220 (shown in FIG. 3A) and a second 4F image assembly 226. The nascent signal beam 223 is adjusted by movement of the occluder 225 as indicated by occluder motion arrow 228. Adjustment of the nascent signal beam 223 changes the portions of the data encoding element 240 that are active 241 and inactive 246, which changes the signal beam angular aperture. In some embodiments, occlusion of nascent signal beam 223 as shown in FIG. 3C is employed to prevent the nascent signal beam from shining on the inactive portion 246, and the pixels of the inactive portion are further maintained in a darkened state by virtue of the polarity of light reflected therefrom. Accordingly, stray light that might reach the inactive portion 216, despite blocking part of the nascent signal beam with the occluder 225, is directed away from the objective lens 245 and the photosensitive recording medium 258.

The first, second, third, and fourth holograms 249A-249D described above are typically, but not necessarily, included in a set of multiple holograms comprising at least 50 holograms. The set of multiple holograms includes typically at least 150 holograms, more typically at least 450 holograms, still more typically at least 750 holograms, and most typically over 900 holograms. In some embodiments, the set of multiple holograms includes 1200 or more holograms. Each hologram in the set of multiple holograms typically at least partially spatially overlaps every other hologram in the set of multiple holograms. Thus a volume of the photosensitive recording medium is common to (i.e. shared by) each hologram in the set of multiple holograms. The set of multiple holograms can be angle multiplexed in one stack. In some embodiments, the set of multiple holograms can be distributed among multiple stacks that partially overlap each other through polytopic multiplexing.

A Second Embodiment Dynamic Aperture Holographic System

Figure 10:
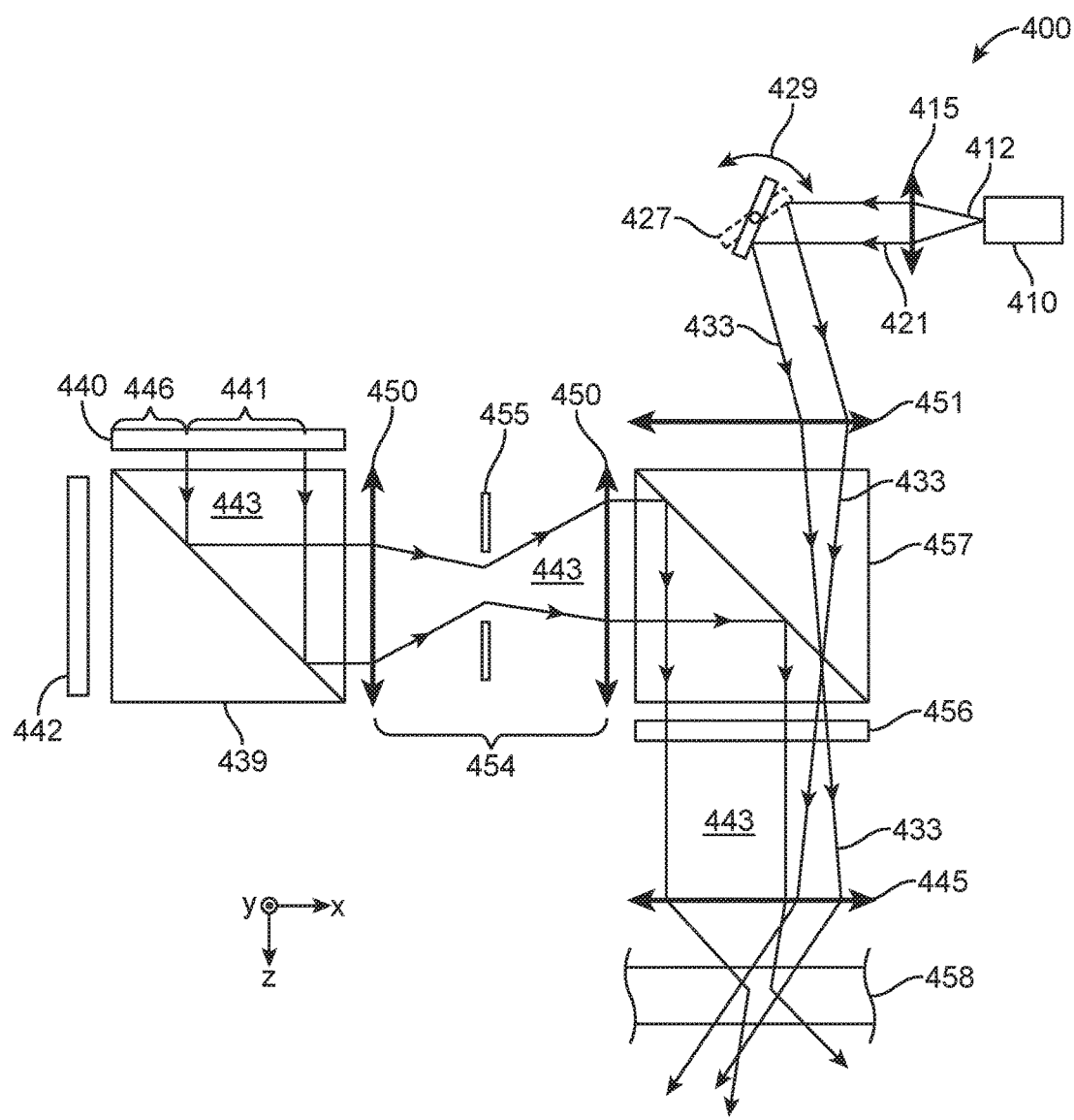
FIG. 10 illustrates a side, cross-section view of a holographic data storage system including monocular architecture, adapted to perform dynamic aperture holography according to an embodiment of the present invention.

A second embodiment dynamic aperture holographic system 400, illustrated in FIG. 10, includes monocular architecture and is configured to readily perform dynamic aperture holography. The second embodiment system 400 includes an external cavity diode laser 410 configured to produce a coherent light beam 412, which passes through collimating lens 415 to produce a collimated light beam 421. The collimated light beam 421 propagates to mirror galvanometer 427, whereupon it is directed as a reference beam 433 through reference beam converging lens 451. The mirror galvanometer 427 is configured to rotate through a defined range, the rotation being illustrated by rotation arrow 429. The rotation of the mirror galvanometer 427 thus directs the reference beam 433 through the reference beam converging lens 451 at various angles. Reference beam angular aperture is thus adjusted using the mirror galvanometer 427.

The reference beam 433 is typically focused on or proximate thin strip half-wave plate 456 by converging lens 451. Polarity of the linearly-polarized reference beam 433 is rotated 90 degrees by the thin strip half-wave plate 456, whereupon the reference beam 433 propagates through objective lens 445 and is subsequently incident upon the photosensitive recording medium 458 as a plane wave reference beam. The plane wave reference beam interferes with signal beam 443 to generate an interference pattern, which is recorded as a hologram in the photosensitive recording medium 458. Prior to encountering the thin strip half-wave plate, polarity of the reference beam 433 is orthogonal to polarity of the linearly-polarized signal beam 443, such that the reference beam 433 passes straight through second polarized beam splitter (PBS) 457. Subsequently, reference beam polarity is rotated 90 degrees by the thin strip half-wave plate 456 to match polarity of the signal beam 443. The thin strip half-wave plate typically resides in a back focal plane of the objective lens 445.

SLM 440 typically receives a nascent signal beam (not shown) from the external cavity diode laser 410, with the nascent signal beam being modulated by the SLM 440 to generate the signal beam 443. The signal beam 443 typically includes an image of a pixel pattern generated by an active portion 441 of SLM 440. An inactive portion 446 of the SLM 440 consists essentially of dark pixels containing no data encoded therein. Following modulation by the SLM 440, the signal beam is redirected by first PBS 439 through 4F image assembly 454. After passing through the 4F image assembly 454, which comprises two converging lenses 450 and an aperture plate 455, the signal beam 443 is redirected by second PBS 457 past thin strip half-wave plate 456 to objective lens 445. The thin strip half-wave plate typically resides at a focal plane of the SLM 440, and is sufficiently narrow that it occludes only a 16-32 rows of pixels in the image of the pixel pattern residing in the signal beam 443. Variations of the thin strip half-wave plate have a width along the y axis of 10-11 um, and thus occlude only a single row of pixels in the image of the pixel pattern. After passing through objective lens 445, the signal beam 443 and reference beam 433 interfere with each other, and the resulting interference pattern is recorded as a hologram in the photosensitive recording medium 458. A detector 442 is typically not used for recording holograms but can be used for detecting reconstructed images from holograms.

Persons of ordinary skill in the art will recognize that reference beams and signal beams refract as the beams interact with photosensitive recording medium. However, refraction of the beams with respect the photosensitive recording medium is not shown in the accompanying Figures because such refraction may be only tangentially related to the present invention. The refraction can therefore be ignored for the purposes of this specification and appended claims.

k-Space Formalism for Holography

Holographic recording and diffraction can be analyzed using k-space formalism, as described in M. R. Ayres, "k-Space Formalism," in K. Curtis, L. Dhar, W. L. Wilson, A. Hill, M. R. Ayres, *Holographic Data Storage: From Theory to Practical Systems*, John Wiley & Sons, Ltd. (2010), pp. 26-31. In k-space, propagating optical waves and holographic gratings may be represented by three-dimensional Fourier transforms of their distributions in real space. For example, a collimated monochromatic reference beam can be represented in real space and k-space by equation (1), $$E_r(\vec{r}) = A_r \exp(i\vec{k}_r \cdot \vec{r}) \overset{\mathfrak{J}}{\to} E_r(\vec{k}) = A_r \delta(\vec{k} - \vec{k}_r), \quad (1)$$

where $E_r(\vec{r})$ is the optical scalar field distribution at all $\vec{r} = \{x, y, z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the complex amplitude of the field, and $\vec{k}_r$ is a vector whose length indicates the spatial frequency of the light waves, and whose direction indicates the direction of propagation. In some examples, all beams may be composed of light of the same wavelength, so all optical k-vectors may have the same length (e.g., $|\vec{k}_r| = k_n$). Thus, all optical propagation vectors may lie on a sphere of radius $k_n$. This construct is known as the k-sphere.

Another important k-space distribution is that of the holograms themselves. Holograms for data storage usually include spatial variations of the index of refraction within the recording medium, typically denoted $\Delta n(\vec{r})$. Ideally, this index modulation pattern is proportional to the spatial intensity of the recording interference pattern, i.e. as shown in equation (2), $$\Delta n(\vec{r}) \propto |E_s(\vec{r}) + E_r(\vec{r})|^2 = |E_s(\vec{r})|^2 + |E_r(\vec{r})|^2 + \\ E_s^*(\vec{r}) E_r(\vec{r}) + E_s(\vec{r}) E_r^*(\vec{r}), \quad (2)$$

where $E_s(\vec{r})$ is the spatial distribution of the signal beam field. The final term in this expansion, $E_s(\vec{r})E_r^*(\vec{r})$, is the signal-bearing (data band) term. Thus we can write equation (3), $$E_s(\vec{r})E_r^*(\vec{r}) \overset{\mathfrak{J}}{\to} E_r(\vec{k}) \otimes E_s(\vec{k}), \quad (3)$$

where $\otimes$ is the 3D cross-correlation operator. This is to say, the product of one field and the complex conjugate of another in the spatial domain become a cross-correlation of their respective Fourier transforms in the frequency domain.

Figure 11:
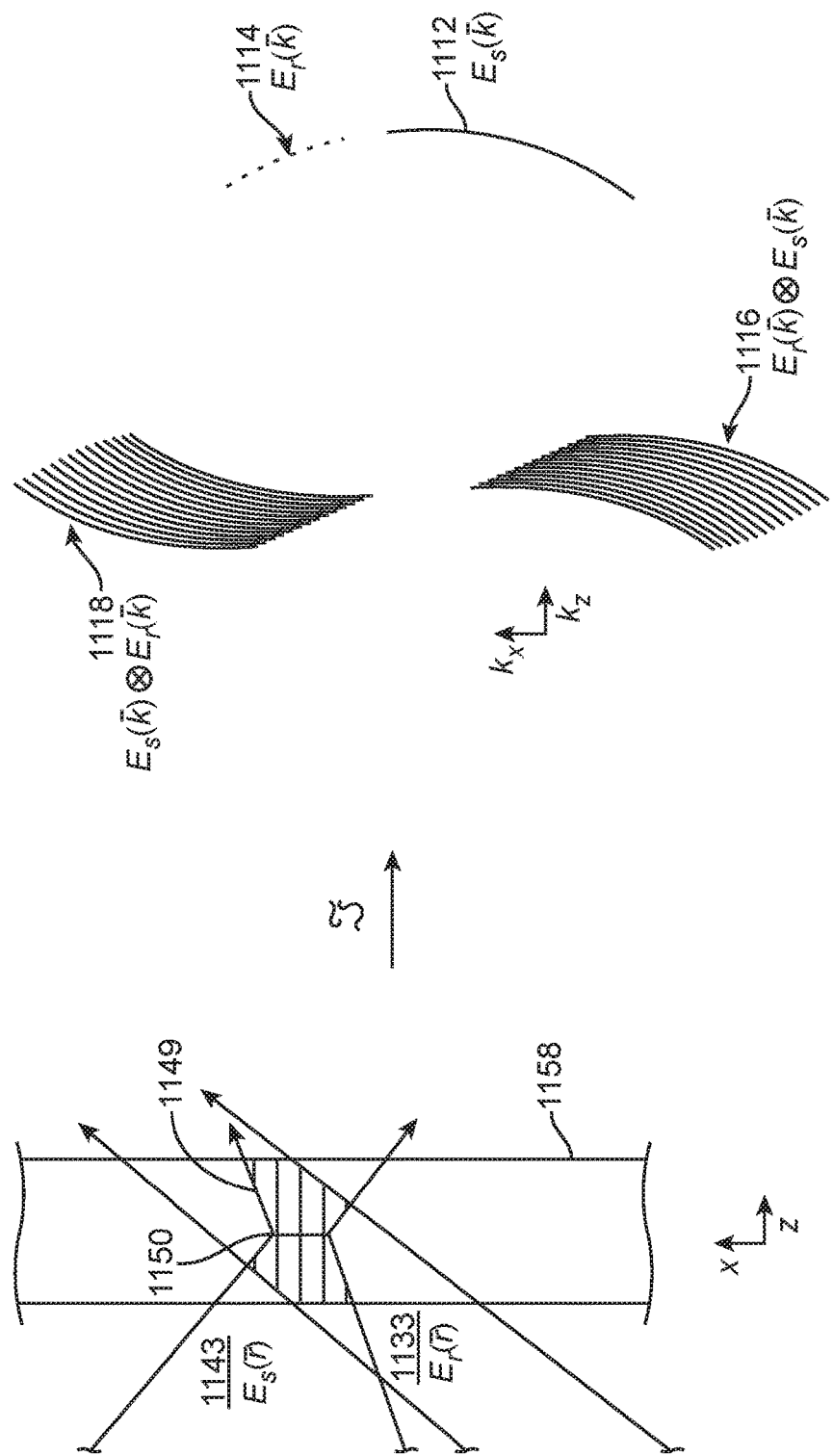
FIGS. 11A and 11B illustrate cross-sections of real space and k-space distributions of holographic recording terms.

FIGS. 11A and 11B illustrate example distributions for a Fourier angular-multiplexing geometry. In particular, FIG. 11A shows a cross-section of signal beam 1143 ($E_s(\vec{k})$) and reference beam 1133 ($E_r(\vec{r})$) in real space. Data bearing hologram 1149 resides where the beams intersect within the recording medium 1158, with narrow waist 1150 corresponding to a Fourier plane.

FIG. 11B illustrates these same distributions in k-space. Since $E_s(\vec{k})$ 1112 and $E_r(\vec{k})$ 1114 represent monochromatic optical fields, they may be confined to arcs along the k-sphere. Note that while $E_r(\vec{r})$ 1133 shows only a single collimated reference beam, the dots in the arc of $E_r(\vec{k})$ 1114 represent multiple reference beams used to write an angle-multiplexed stack of holograms. Note also that while $E_r(\vec{k})$ 1114 may be confined largely to the plane of the figure, $E_s(\vec{k})$ 1112 may extend out of the figure plane to subtend a page-shaped region (or "patch") on the surface of the sphere. In FIG. 11B, it can be seen that the data band 1116 distribution can be constructed graphically from the cross-correlation of the signal patch $E_s(\vec{k})$ 1112 with the reference arc $E_r(\vec{k})$ 1114. A conjugate data band 1118 may be similarly constructed by reversing the order of the operands.

The internal structure of the data bands is also indicated. The entire data band (along with the conjugate data band) represents the k-space locus of the holographic fringes for all of the holograms in an angle-multiplexed hologram stack, and each hologram occupies an $E_s(\vec{k})$ 1112 patch-shaped layer within each of the bands. Each layer has a slight thickness (determined by the Bragg selectivity imparted by the medium thickness) and may be packed in a nested fashion similar to the layers of an onion within the data band to maximize density. It should be noted that while FIG. 11B depicts only 14 layers, hundreds or more may be present in an actual implementation. Each hologram/layer may thus occupy a different (substantially disjoint) region of k-space, such that there is little to no cross-talk from other holograms during reconstruction.

Figure 12:
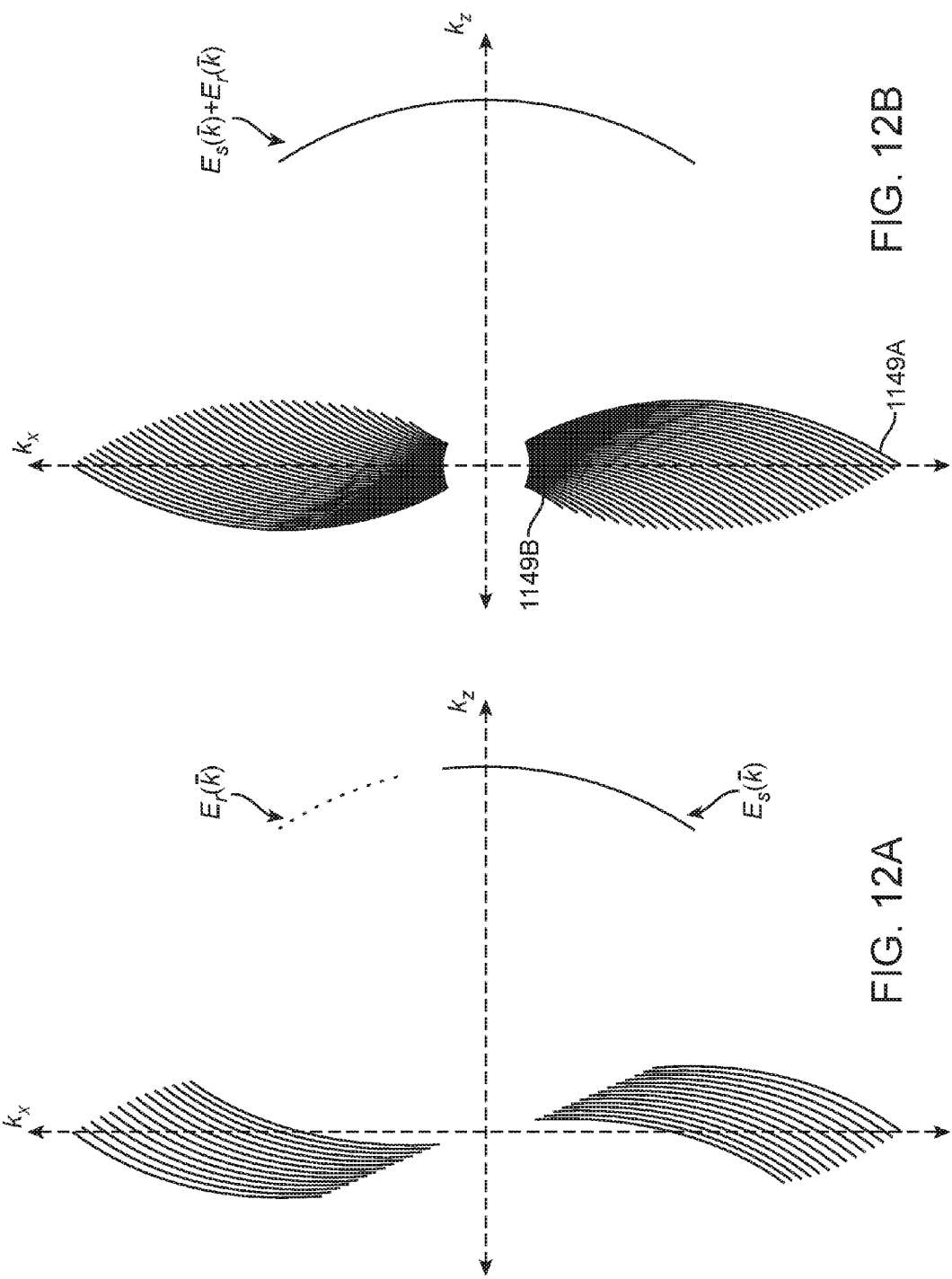
FIG. 12A illustrates a cross-section of a k-space distribution of holographic recording terms obtained using angle multiplexing.
FIG. 12B illustrates a cross-section of a k-space distribution of holographic recording terms obtained using dynamic aperture holography in combination with angle multiplexing, according to an embodiment of the present invention.

FIG. 12A illustrates the results of a k-space analysis for the system 100 shown in FIG. 1 using a method similar to that described above with respect to FIGS. 11A and 11B, wherein dynamic aperture holography is not used. FIG. 12A illustrates a cross-section of k-space distributions for a monocular system. In contrast, FIG. 12B shows the analogous k-space distributions that may result using dynamic aperture holography as described above with respect to FIGS. 3-10. An initial hologram 1149A in a stack and last hologram 1149B in the stack are readily visualized in 12B. As is evident in FIG. 12B, the layers representing individual holograms within the data band continue to nest in disjoint regions of k-space despite the fact that the loci of $E_s(\vec{k})$ and $E_r(\vec{k})$ are no longer disjoint over the multiplexed set. The overall volume occupied by the data band and conjugate data band is larger than in that shown in FIG. 12A, reflecting the increased hologram density in an embodiment of dynamic aperture holography.

Dynamic Aperture Equalization

As shown in FIG. 12B, the distributions of the holograms are packed more densely near the origin (e.g., low spatial frequency) than they are further away from it. This is a manifestation of lower Bragg selectivity exhibited by gratings of lower frequency compared to those of higher frequency, which is well-known among those skilled in the art. For this reason, cross-talk between holograms may be higher in page regions corresponding to lower grating frequencies, and these worst-case regions tend to limit the achievable density of angle multiplexing. Thus, in some examples, dynamic aperture equalization may be performed to mitigate this effect.

Embodiments of dynamic aperture equalization may be performed by interleaving larger holograms with smaller holograms. For example, separation angle between a signal beam angular aperture and its respective reference beam angular aperture may be changed every other hologram so that only the odd (or alternatively even) numbered holograms have a lower separation angle. Other things being equal, holograms recorded with a lower separation angle can contain more data because a greater signal beam angular aperture can be accommodated for a given reference beam angular aperture where separation angle between them is reduced. Hologram size (i.e. larger or smaller) refers to quantity of data encoded within the hologram. Thus a larger hologram contains more data than a smaller hologram, and a smaller hologram contains less data than a larger hologram.

Figure 13:
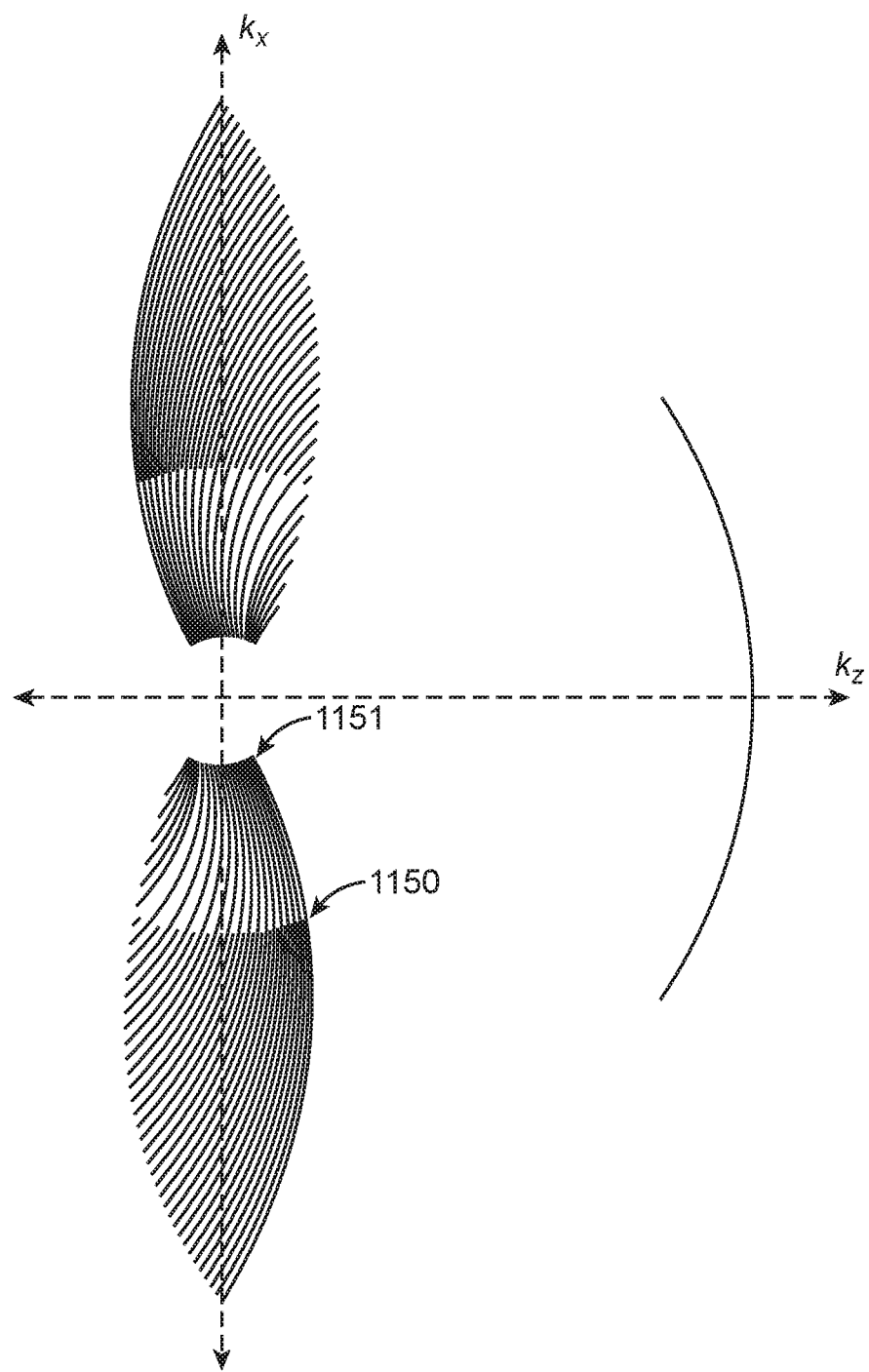
FIG. 13 illustrates a cross-section of a k-space distribution of holographic recording terms obtained using dynamic aperture equalization in combination with angle multiplexing, according to an embodiment of the present invention.

In embodiments described with respect to FIGS. 5A-C through 8A-C, the beam angular apertures for signal beams used to record odd holograms are separated from beam angular apertures of their respective reference beams by 25 degrees as described, while the beam angular apertures of the signal beams used to record even holograms are separated from the beam angular apertures of their respective reference beams by 65°. The resulting k-space distributions, illustrated in FIG. 13, show a considerable decrease in hologram packing density in comparison to FIG. 12B. Edge of even number holograms 1150 and edge of odd number holograms 1151 are shown in FIG. 13. Interleaving hologram sizes in this way allows for the angular separation between reference beams to be decreased, leading to a considerable recording density increase. This increase may come at the cost of reduced transfer rate, as the average hologram size is smaller. However, hologram size interleaving typically presents diminishing returns at higher reference beam angular apertures.

In other examples, dynamic aperture equalization may be performed with or without disjoint loci of $E_s(\vec{k})$ and $E_r(\vec{k})$ in k-space. For example, dynamic aperture equalization could be performed using the conventional monocular apparatus of FIG. 1 by interleaving two different page sizes. Additionally, interleaving patterns of different lengths (not just odd/even), and patterns that are not cyclical may also be performed. In general, any technique that equalizes the k-space modulation distribution may be performed and may be referred to as dynamic aperture equalization.

Error Correction Parity Distribution

Holographic storage devices typically employ error correcting codes in order to achieve robust data recovery in the presence of recovery errors. For example, systematic codes may be used to append parity data to the input data to allow for reconstruction when some part of the input data cannot be recovered. Examples of systematic codes include low density parity check (LDPC) codes and Reed-Solomon codes.

In some examples using dynamic aperture holography, parity data is preferentially recorded in a subset of holograms, while input data may be preferentially recorded in another subset of holograms. In one example, parity data is preferentially recorded in smaller holograms, while input data is preferentially recorded to larger holograms. Distributing data in this way typically improves recovery transfer rate because, in the event of error-free recovery of the input data, the parity data residing on the smaller holograms need not be recovered.

Multiple Locus Aperture Sharing

In some examples, regions of the aperture may be shared multiple times. Multiple sharing of the signal and/or reference angular apertures can be used to access grating space that is inaccessible to the "singly shared" methods discussed above. Multiple sharing in this context is distinct from the "sharing" of an underlying multiplexing scheme, such as the angle multiplexing described above.

In an example, multiple locus aperture sharing may include double sharing, and may be performed with the dynamic aperture holography described above. FIGS. 14A and 14B illustrate exemplary arrangements for double aperture sharing. FIG. 14A shows an angular aperture map representing dynamic aperture holography similar to that illustrated in FIGS. 5B, 6B, 7B, and 8B, with two modifications: 1) the angular aperture map has been rotated by −45°; and 2) a first signal beam angular aperture second edge 1473A is included in addition to first signal beam angular aperture first edge 1472A. This arrangement may be used to effect dynamic aperture holography in the manner described above, with the first signal beam angular aperture first edge 1472A remaining separated from its respective first reference beam angular aperture by at least a minimum separation angle as the first reference beam angular aperture transits along its locus 1480A. Additionally, the first signal beam angular aperture second edge 1473A is dynamically changed so that the absolute value of its y-component is always less than or equal to the y-component of the respective first reference beam. Then, by applying the k-space formalism described above, it is apparent that the $k_y$ component of the data band grating distribution so generated will always be less than zero (e.g., the data band lies in the negative $k_y$ half of k-space). The conjugate data band, conversely, has a $k_y$ component greater than zero.

FIG. 14B is similar to FIG. 14A, except that the distributions have been flipped about the x-axis. Accordingly, second signal beam angular aperture first 1472B and second 1473B edges bound a second signal beam angular aperture. A reference beam angular aperture locus 1480B is similarly flipped about the x-axis. By similar k-space formalism analysis, it is apparent that the data band grating distribution for this example will lie entirely in the positive $k_y$ half of k-space (and the conjugate band will lie in the negative half). One may verify that the distributions of both data bands and both conjugate data bands are mutually disjoint by construction, and therefore both sets of holograms may be multiplexed into the same volume of recording medium. Such a system can achieve increased recording density compared to dynamic aperture holography as exemplified in FIGS. 4-10.

While a specific locus shared aperture example is provided above, it should be appreciated that other multiple locus shared aperture schemes may be used. The multiple locus hologram distributions may or may not be symmetric in k-space, and three, four, or even more distributions may be employed. The method may be practiced in combination with angle multiplexing, polytopic multiplexing, and numerous other multiplexing methods.

Collinear Holographic Data Storage

Figure 15:
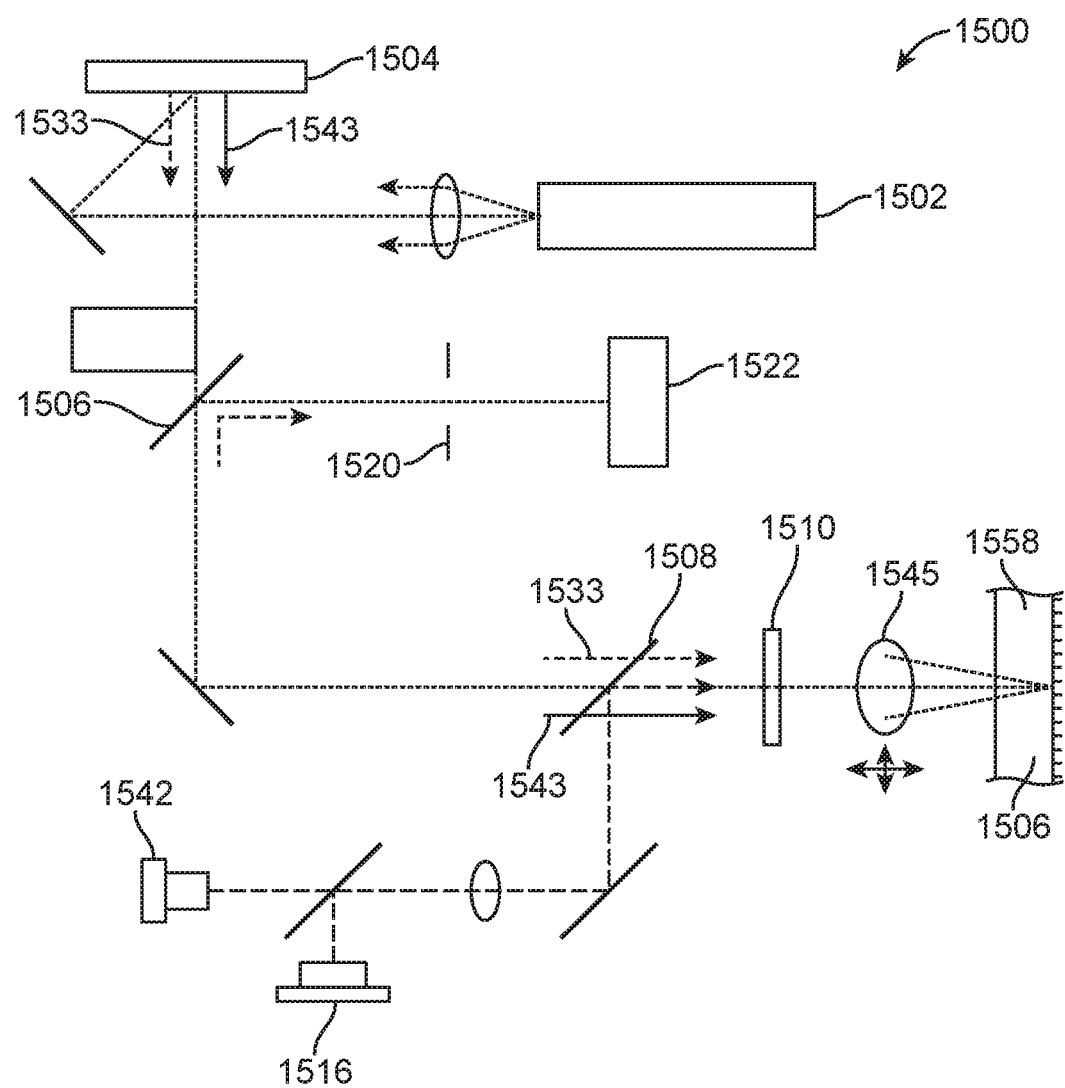
FIG. 15 illustrates a system diagram for a collinear holographic data storage system.

FIG. 15 illustrates an example collinear holographic data storage system 1500. System 1500 generally includes a laser source 1502 (e.g., green or blue), an SLM 1504 for producing a reference beam 1533 and a signal (information) beam 1543, a polarizing beam splitter (PBS) 1506, a dichroic mirror 1508, quarter-wave plate (QWP) 1510, objective lens 1545, recording media 1558, red laser source 1516, photodetector 1542, ring mask 1520, land CMOS or CCD sensor 1522. System 1500 may further include a processor (not shown) for controlling laser sources 1502 and 1516, SLM 1504, and other components of the system. Additional lenses and/or reflectors may also be included in system 1500, as shown in FIG. 15.

Figure 16:
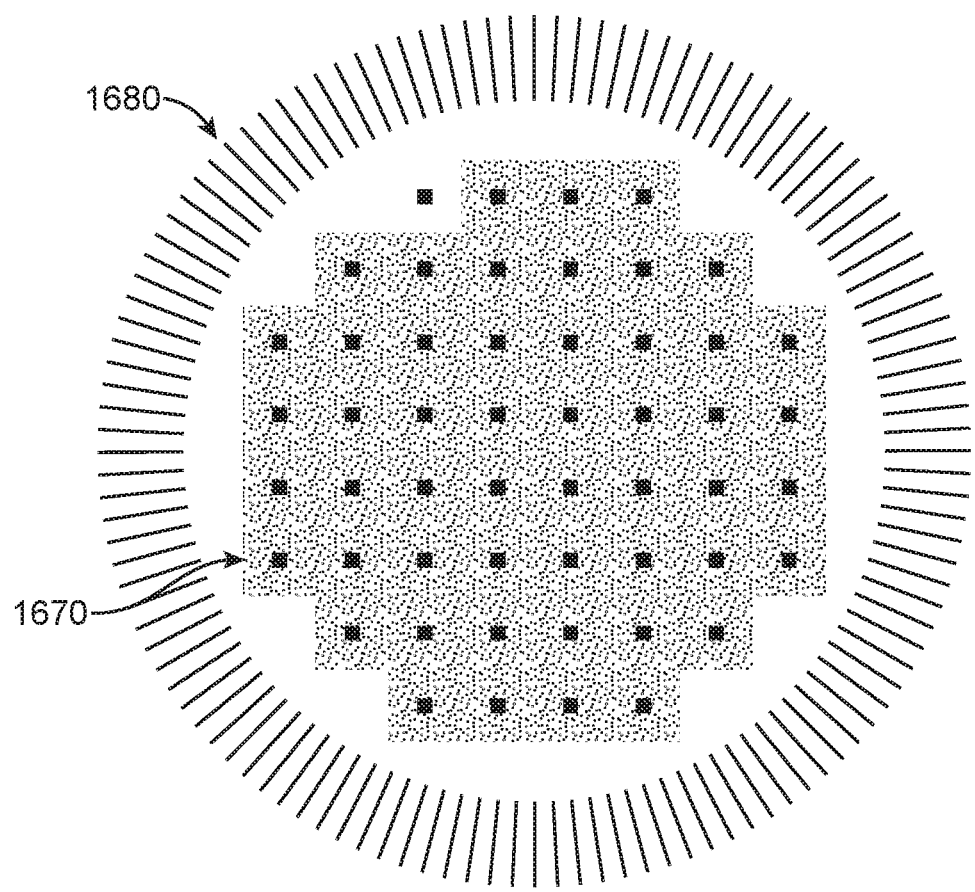
FIG. 16 illustrates an SLM pattern and angular aperture map for collinear holographic recording.

During the write process, a combined image of the signal beam and the reference beam, as shown in the angular aperture map of FIG. 16, may be produced by SLM 1604. A reference beam angular aperture locus 1680 and a signal beam angular aperture locus 1670, showing the annular reference pattern of the reference beam angular aperture locus 1680 surrounding the central signal beam angular aperture locus 1670. Referring now to FIG. 15, the p-polarized output of SLM 1504 may pass through PBS 1506 and may then be incident on QWP 1510. The p-polarized beams may be converted to a circularly polarized state by QWP 1410 and may be focused in the holographic recording media 1558 by objective lens 1545.

During the read process, only the outer reference beam may be generated by SLM 1504 and passed through PBS 1506, QWP 1510, and objective lens 1545 onto holographic recording media 1558. A reconstructed signal beam may be produced and may be reflected back through objective lens 1545 and passed through QWP 1508, where it may be converted from a circularly polarized state to an s-polarized state. The reconstructed signal beam may be then reflected by PBS 1506 and detected using CMOS or CCD sensor 1522. Red laser source 1516 may be used for optical servo control to adjust the focal point of the objective lens 1545.

Figure 17C:
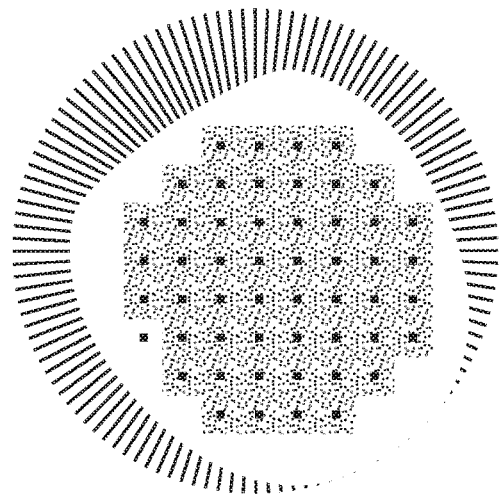
FIGS. 17A-17C illustrate a scheme for performing dynamic aperture holography using a collinear system according to an embodiment of the present invention.

A collinear system similar or identical to that shown in FIG. 15 may be modified to benefit from dynamic aperture holography. For example, the modified SLM patterns of FIG. 17 may be generated by shifting the position of the signal beam angular aperture to the edge of the SLM (e.g., in the directions of 0°, 120°, and 240° for FIGS. 17A, 17B, and 17C respectively) and modifying the position of the reference beam angular aperture to accommodate these shifts. In some examples, a separation angle may be maintained between edges of the signal beam angular aperture and the reference beam angular aperture. The separation angle may be the same or different for each of the modified patterns.

Figure 17B:
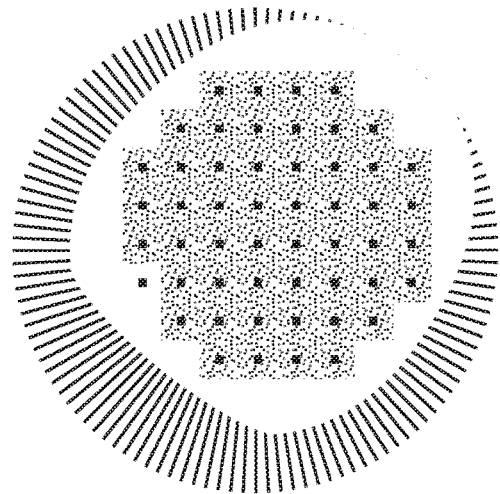
Figure 17A:
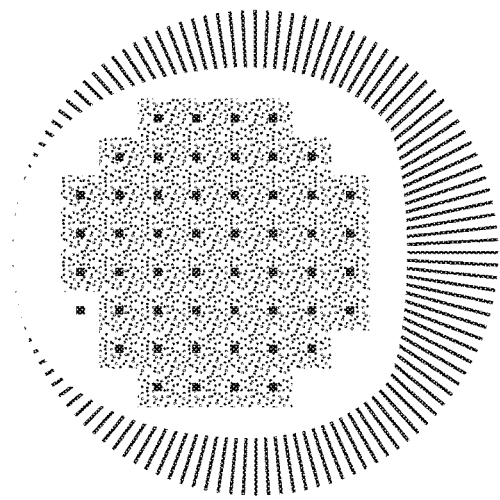

Modifying the collinear system in this way may advantageously provide at least two benefits:
1) Though the k-space hologram distributions generated by the three patterns are substantially overlapping, the overall volume of the data bands and conjugate data bands of the holograms so multiplexed may be larger than in the conventional case. This may result in a higher recording density.
2) Analysis as described in T. Shimura, M. Terada, Y. Sumi, R. Fujimura, and K. Kuroda, "Inter-page crosstalk noise in collinear holographic memory," Joint Int. Symp. on Opt. Memories and Opt. Data Storage, Waikoloa, Hi., July (2008), paper TuPO4, shows that inter-page cross-talk noise in collinear holography goes as an incoherent sum of contributions from the multiplexed pages. The k-space hologram distributions for conventional collinear holograms are completely overlapping, but the distributions of, e.g., FIGS. 17A and 17B are only partially overlapping. Thus the cross-talk contributions between the differing SLM patterns of FIGS. 17A and 17B are lower than in the conventional case, leading to increased signal-to-noise ratio and hence increased recording density.

Collinear holography relies on a correlation effect for holographic multiplexing. In contrast to angle multiplexing where individual holograms occupy disjoint regions of k-space, individual holograms in collinear recording are broadly distributed and densely overlapped with other holograms, leading to cross-talk expressions such as that of Shima et al. Dynamic aperture holography described herein serves to slightly reduce the overlap of these distributions, and thus serves to slightly reduce cross-talk by driving the design toward a more disjoint k-space partitioning scheme. Other variations of this technique may be implemented under the scope of the present invention.

Figure 18:
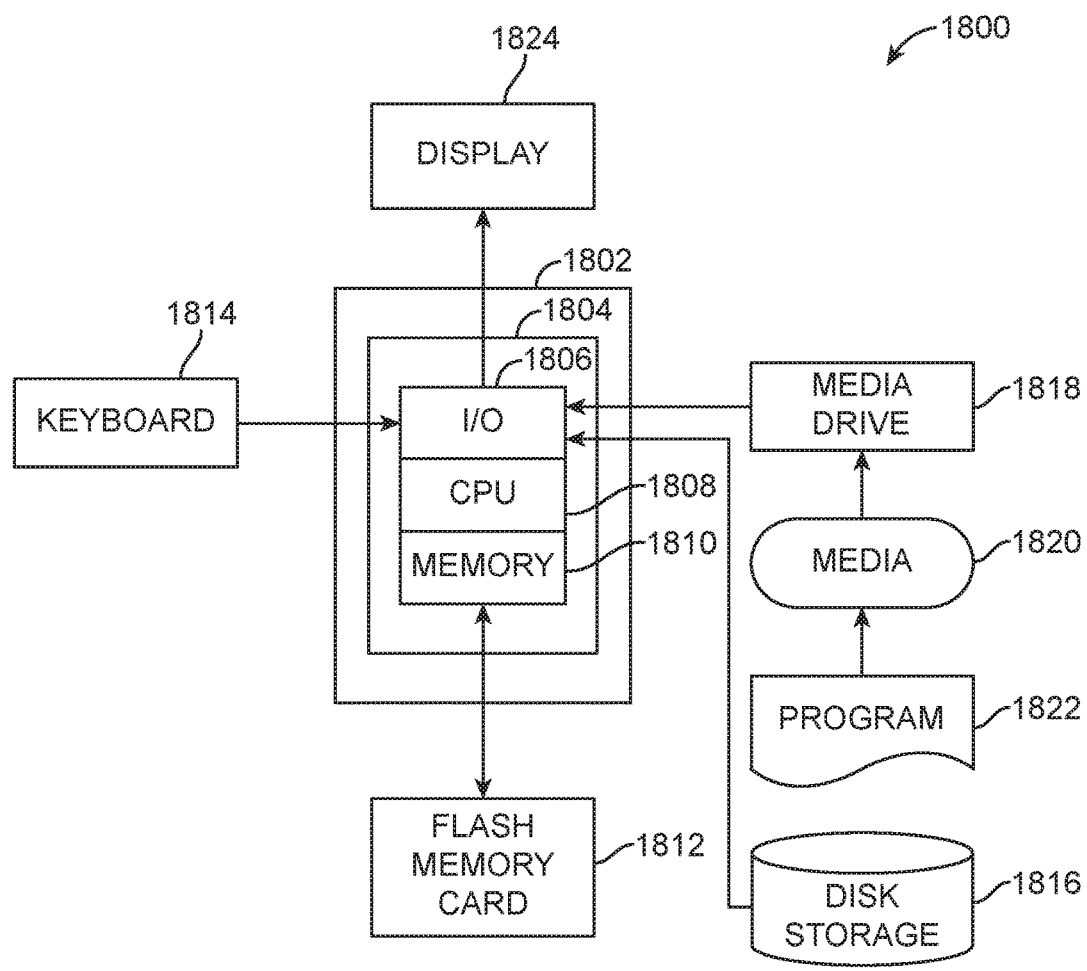
FIG. 18 illustrates a computing system according to an embodiment of the present invention.

FIG. 18 depicts computing system 1800 with a number of components that may be used to perform the above-described processes. The main system 1802 includes a motherboard 1804 having an input/output ("I/O") section 1806, one or more central processing units ("CPU") 1808, and a memory section 1810, which may have a flash memory card 1812 related to it. The I/O section 1806 is connected to a display 1824, a keyboard 1814, a disk storage unit 1816, and a media drive unit 1818. The media drive unit 1818 can read/write a non-transitory computer-readable storage medium 1820, which can contain programs 1822 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of the present invention.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:
1. A method of using dynamic aperture holography for recording multiple holograms, the method comprising:
    generating a first signal beam by encoding data into a nascent signal beam using a data encoding element, wherein the data encoding element includes an inactive portion that does not have data encoded therein;
    projecting the first signal beam through an objective lens into a photosensitive recording medium at a first signal beam angular aperture;
    projecting a first reference beam into the photosensitive recording medium at a first reference beam angular aperture, wherein:
        the first reference beam and the first signal beam interfere with each other to form a first interference pattern, the first interference pattern being recorded as a first hologram in the photosensitive recording medium;
        the inactive portion of the data encoding element is not represented in the first hologram; and the first signal beam angular aperture is separated from the first reference beam angular aperture by a first separation angle;

generating a second signal beam by encoding data into the nascent signal beam using the data encoding element;

projecting the second signal beam through the objective lens into the photosensitive recording medium at a second signal beam angular aperture that differs from the first signal beam angular aperture in at least one of size and position, wherein the second signal beam angular aperture is changed from the first signal beam angular aperture by changing the inactive portion of the data encoding element;

projecting a second reference beam into the photosensitive recording medium at a second reference beam angular aperture, wherein:

the second reference beam angular aperture differs in position from the first reference beam angular aperture;

the second reference beam and the second signal beam interfere with each other to form a second interference pattern, the second interference pattern being recorded as a second hologram in the photosensitive recording medium;

the inactive portion of the data encoding element is not represented in the second hologram;

the second signal beam angular aperture is separated from the second reference beam angular aperture by a second separation angle;

each of the first separation angle and the second separation angle are equal to or greater than a predetermined minimum separation angle; and the second reference beam angular aperture is separated from the first signal beam angular aperture by less than the predetermined minimum separation angle.

2. The method of claim 1, wherein:
the first reference beam has the same wavelength as the first signal beam; and
the second reference beam has the same wavelength as the second signal beam.

3. The method of claim 2, wherein the first hologram at least partially overlaps the second hologram in the photosensitive recording medium.

4. The method of claim 3, wherein a position of the photosensitive recording medium relative to the objective lens is the same when the first hologram is being recorded in the photosensitive recording medium as when the second hologram is being recorded in the photosensitive recording medium.

5. The method of claim 4, wherein the first hologram and the second hologram are angle multiplexed in one stack of holograms.

6. The method of claim 5, wherein the second signal beam angular aperture has a smaller size than the first signal beam angular aperture.

7. The method of claim 3, wherein the first signal beam angular aperture overlaps the second reference beam angular aperture.

8. The method of claim 1, wherein said changing the inactive portion of the data encoding element includes adjusting the nascent signal beam by moving an occluder that blocks a portion of the nascent signal beam from reaching the data encoding element.

9. The method of claim 8, wherein the occluder includes a shutter residing at an image plane of the nascent signal beam.

10. A method of using dynamic aperture holography for recording multiple holograms, the method comprising:

generating a first signal beam by encoding data into a nascent signal beam using a data encoding element, wherein an occluder blocks a portion of the nascent signal beam from reaching the data encoding element;

projecting the first signal beam through an objective lens into a photosensitive recording medium at a first signal beam angular aperture;

projecting a first reference beam into the photosensitive recording medium at a first reference beam angular aperture, wherein:

the first reference beam and the first signal beam interfere with each other to form a first interference pattern, the first interference pattern being recorded as a first hologram in the photosensitive recording medium; and the first signal beam angular aperture is separated from the first reference beam angular aperture by a first separation angle;

generating a second signal beam by encoding data into the data encoding element using the data encoding element, wherein the occluder blocks the portion of the nascent signal beam from reaching the data encoding element;

projecting the second signal beam through the objective lens into the photosensitive recording medium at a second signal beam angular aperture that differs from the first signal beam angular aperture in at least one of size and position, wherein the second signal beam angular aperture is changed from the first signal beam angular aperture by adjusting the portion of the nascent signal beam blocked by the occluder;

projecting a second reference beam into the photosensitive recording medium at a second reference beam angular aperture, wherein:

the second reference beam angular aperture differs in position from the first reference beam angular aperture;

the second reference beam and the second signal beam interfere with each other to form a second interference pattern, the second interference pattern being recorded as a second hologram in the photosensitive recording medium;

the second signal beam angular aperture is separated from the second reference beam angular aperture by a second separation angle;

each of the first separation angle and the second separation angle are equal to or greater than a predetermined minimum separation angle; and the second reference beam angular aperture is separated from the first signal beam angular aperture by less than the predetermined minimum separation angle.

11. The method of claim 10, wherein a position of the photosensitive recording medium relative to the objective lens is the same when the first hologram is being recorded in the photosensitive recording medium as when the second hologram is being recorded in the photosensitive recording medium.

12. The method of claim 10, wherein:
the first reference beam has the same wavelength as the first signal beam; and
the second reference beam has the same wavelength as the second signal beam.

13. The method of claim 12, wherein the first signal beam angular aperture overlaps the second reference beam angular aperture.

14. The method of claim 10, wherein the occluder includes a shutter residing at an image plane of the nascent signal beam.

15. The method of claim 10, wherein the first hologram and the second hologram are angle multiplexed in one stack of holograms.

16. The method of claim 15, wherein the second signal beam angular aperture has a smaller size than the first signal beam angular aperture.

17. A method of using dynamic aperture holography for recording multiple holograms, the method comprising:
projecting a first signal beam into a photosensitive recording medium at a first signal beam angular aperture;
projecting a first reference beam into the photosensitive recording medium at a first reference beam angular aperture, wherein:
the first reference beam has the same wavelength as the first signal beam;
the first reference beam and the first signal beam interfere with each other to form a first interference pattern, the first interference pattern being recorded as a first hologram in the photosensitive recording medium; and
the first signal beam angular aperture is separated from the first reference beam angular aperture by a first separation angle;
projecting a second signal beam into the photosensitive recording medium at a second signal beam angular aperture that differs from the first signal beam angular aperture in at least one of size and position;
projecting a second reference beam into the photosensitive recording medium at a second reference beam angular aperture, wherein:
the second reference beam has the same wavelength as the second signal beam;
the second reference beam and the second signal beam interfere with each other to form a second interference pattern, the second interference pattern being recorded as a second hologram in the photosensitive recording medium;
the second reference beam angular aperture differs in position from the first reference beam angular aperture;
the second signal beam angular aperture is separated from the second reference beam angular aperture by a second separation angle;
each of the first separation angle and the second separation angle are equal to or greater than a predetermined minimum separation angle;
the second reference beam angular aperture is separated from the first signal beam angular aperture by less than the predetermined minimum separation angle; and
the first hologram at least partially overlaps the second hologram in the photosensitive recording medium.

18. The method of claim 17, wherein:
said projecting the first signal beam into the photosensitive recording medium includes projecting the first signal beam through an objective lens;
said projecting the second signal beam into the photosensitive recording medium includes projecting the second signal beam through the objective lens; and
a position of the photosensitive recording medium relative to the objective lens is the same when the first hologram is being recorded in the photosensitive recording medium as when the second hologram is being recorded in the photosensitive recording medium.

19. The method of claim 17, wherein the first hologram and the second hologram are angle multiplexed in one stack.

20. The method of claim 17, wherein the first signal beam angular aperture overlaps the second reference beam angular aperture.

* * * * *